United States Patent
Funatsu et al.

(10) Patent No.: US 9,011,743 B2
(45) Date of Patent: *Apr. 21, 2015

(54) LIQUID CRYSTAL POLYESTER FIBERS AND METHOD FOR PRODUCING THE SAME

(75) Inventors: Yoshitsugu Funatsu, Mishima (JP); Yuhei Maeda, Mishima (JP); Norio Suzuki, Mishima (JP); Hiroo Katsuta, Mishima (JP)

(73) Assignee: Toray Industries, Inc., Tokyo (JP)

( * ) Notice: Subject to any disclaimer, the term of this patent is extended or adjusted under 35 U.S.C. 154(b) by 422 days.

This patent is subject to a terminal disclaimer.

(21) Appl. No.: 13/255,524

(22) PCT Filed: Mar. 4, 2010

(86) PCT No.: PCT/JP2010/053506
§ 371 (c)(1),
(2), (4) Date: Sep. 9, 2011

(87) PCT Pub. No.: WO2010/103986
PCT Pub. Date: Sep. 16, 2010

(65) Prior Publication Data
US 2011/0318982 A1    Dec. 29, 2011

(30) Foreign Application Priority Data

Mar. 11, 2009  (JP) ................. 2009-058141
Mar. 23, 2009  (JP) ................. 2009-070298

(51) Int. Cl.
*D03D 15/00*    (2006.01)
*D06M 15/643*   (2006.01)
*C09K 19/38*    (2006.01)
*D01D 10/02*    (2006.01)
*D01F 6/62*     (2006.01)
*D01F 6/84*     (2006.01)
*D02J 13/00*    (2006.01)

(52) U.S. Cl.
CPC ......... *D06M 15/643* (2013.01); *C09K 19/3809* (2013.01); *D01D 10/02* (2013.01); *D01F 6/62* (2013.01); *D01F 6/84* (2013.01); *D02J 13/00* (2013.01)

(58) Field of Classification Search
CPC ...... C09K 19/3809; D01D 10/02; D01F 6/62; D01F 6/84; D02J 13/00; D06M 15/643
USPC ................. 428/356–401; 264/236
See application file for complete search history.

(56) References Cited

U.S. PATENT DOCUMENTS

2010/0104870 A1 *  4/2010  Funatsu et al. ............. 428/401

FOREIGN PATENT DOCUMENTS

| EP | 2123807 A1 | 11/2009 |
|---|---|---|
| JP | 02-200813 A | 8/1990 |
| JP | 03-260114 A | 11/1991 |
| JP | 05-331708 A | 12/1993 |
| JP | 2008-240228 A | 10/2008 |
| JP | 2008-240230 A | 10/2008 |
| WO | WO 2008105439 A1 * | 9/2008 |

* cited by examiner

*Primary Examiner* — Elizabeth Cole
(74) *Attorney, Agent, or Firm* — Birch, Stewart, Kolasch & Birch, LLP

(57) ABSTRACT

Disclosed are liquid crystal polyester fibers, which have a peak half-width of 15° C. or greater at an endothermic peak (Tm1) observed by differential calorimetry under a temperature elevation of 20° C./minute from 50° C., polystyrene equivalent weight average molecular weight of 250,000 or more and 2,000,000 or less, and a variable waveform of less than 10% in terms of the half inert diagram mass waveform determined by a Uster yarn irregularity tester. Also disclosed is a method for producing liquid crystal polyester fibers, wherein liquid crystal polyester fibers are formed into a package, the fibers are then subjected to solid-phase polymerization, and the solid-phase polymerized liquid crystal polyester fibers are unrolled from the package and successively heat treated without being once taken up. The heat treatment temperature is controlled at a temperature of the endothermic peak temperature (Tm1) of the solid-phase polymerized liquid crystal polyester fibers+60° C. or higher, and the speeds of the fibers before and after heat treatment are regulated, respectively, by first and second rollers.

3 Claims, No Drawings

LIQUID CRYSTAL POLYESTER FIBERS AND METHOD FOR PRODUCING THE SAME

This application is a 371 of PCT/JP2010/053506 filed Mar. 4, 2010.

TECHNICAL FIELD OF THE INVENTION

The present invention relates to liquid crystal polyester fibers and a method for producing liquid crystal polyester fibers. The present invention specifically relates to liquid crystal polyester fibers suitable for use of filter and screen gauze, which are high-mesh woven fabrics.

BACKGROUND ART OF THE INVENTION

A liquid crystal polyester is a polymer with rigid molecular chains. It shows high strength and high elastic modulus among fibers, which are produced from a melt-spinning process, since solid-phase polymerization is performed with the molecular chains highly-oriented in a fiber axial direction during the melt-spinning process. As shown in Non-patent document 1, the liquid crystal polyester has thermal resistance and dimensional stability since the solid-phase polymerization increases its molecular weight to raise its melting point. Thus, the liquid crystal polyester fibers have high-strength, high elastic modulus, excellent thermal resistance and excellent thermal dimensional stability by applying the solid-phase polymerization. On the other hand, the liquid crystal polyester fibers have disadvantage, such that the interaction perpendicular to fiber axial direction is low and that abrasion resistance is so inferior that fibrillation may be caused by frictions, because rigid molecular chains are highly oriented in a fiber axial direction to form dense crystals.

Recently, specifically for filters and screen-printing gauzes which are made of monofilaments, higher weaving density (making a mesh higher) and larger opening section areas are demanded in order to improve the performance. To achieve this, the higher single-fiber fineness, the higher strength and the higher elastic modulus are strongly demanded. The liquid crystal polyester fibers are being counted on because of its high strength and high elastic modulus. At the same time, they require to reduce defects at the opening sections to improve performance. However, the liquid crystal polyester fibers have disadvantage against reducing defects at the opening sections, because they do not have enough abrasion resistance to prevent from fibrillation. The fibril is generated by friction during a fiber manufacturing process, and fibers are required to be improved in its abrasion resistance. In addition, the fibril may be also generated from fusion-bonding in the solid-phase polymerization. The fusion-bonding may cause a defect to reduce the fiber lengthwise strength and the uniformity of the fineness. Therefore the fusion-bonding defect is required to be reduced, which means the fiber lengthwise strength or the uniformity of the fineness are required to be improved. Process passability in a higher-order fabric processing such as a weaving process, and weavability itself are worsen, because the fibrils are caught or deposited onto the guide to cause a tension fluctuation. Therefore the liquid crystal polyester fibers are required to improve in the uniformity of fiber-lengthwise strength and fineness and the abrasion resistance.

In order to improve an abrasion resistance of liquid crystal polyester fibers, Patent documents 1-3 disclose a technology in which liquid crystal polyester fibers are heated at (Tm1)+10° C., where an endothermic peak temperature (Tm1) is observed by differential calorimetry under a temperature elevation of 20° C./minute from 50° C. Though that technology can improve the abrasion resistance well, it cannot sufficiently improve the uniformity in the fiber lengthwise direction. The technology disclosed in Patent documents 1-3 comprises two processes of which one is a process where liquid crystal polyester fibers, which have been solid-phase polymerized in a fibrous state, are unrolled and once taken up, and of which the other is a process where fibers are again unrolled from the taken-up packages and subjected to high-temperature heat treatment. Such unrolling process after solid-state polymerization has to be separated from the high-temperature heat treatment process, because the speed in the unrolling process after the solid-state polymerization cannot be easily kept constant and therefore the unrolling process cannot be continued to the high-temperature heat treatment process where the speed is constant. The reason why the speed in the unrolling process after the solid-state polymerization cannot be easily kept constant is explained as follows. Because a package after the solid-state polymerization has been slightly fused, if the fusion-bonding part is strongly forced to be exfoliated, fibers will be fibrillated. In case of such a trouble, it is desirable for the package to be positively driven to rotate so as to feed fibers by unrolling with lower tension. In addition, if the rotation speed is constant the feeding speed gradually decreases as the package is reduced in winding amount. Besides, the feeding speed can be kept constant by controlling the rotation speed. However, such a control method is difficult to be applied to certain fibers like liquid crystal polyester which has low elongation and high elastic modulus, and therefore the tension fluctuates to cause yarn breakage as the speed (rotation speed) changes in a short period.

The technologies in Patent documents 1-3 have problem that fibers polymerized in solid phase are unrolled and once taken up. In order to take the fibers up without loosening, they have to be tensed and taken up into a package as being traversed with a yarn path guide. However, if a yarn, having low abrasion resistance, which has been polymerized in solid phase, is tensed and traversed with the guide, the fibers are slightly fibrillated because both ends of the traverse are specifically tensed. Such a slight fibrillation does not influence the fineness and the strength of fibers so much. However, when exfoliated fibrils are deposited on the traverse guide, the tension fluctuation increases, as the winding amount increases with time passage. That may cause a yarn breakage derived from sudden tension malfunction and also cause a great fibrillation to locally lower the fineness and the strength. Further, the deposited fibril may be rolled up in fibers, causing a trouble that the fineness locally increases. Furthermore, if such a solid-phase polymerized yarn having local abnormal fineness is heat treated at a high temperature, the generation of fibrils worsens the running stability and the tension fluctuation increases at the high-temperature heat treatment as causing the fineness malfunction further. In addition, melt-down of fibers may be caused.

Although an oil addition is desirable for preventing from the fusion-bonding in solid-phase polymerization, the oil deposits as a sublimate in a high-temperature heat treatment equipment so as to contact with fibers running over time and then cause a trouble of tension fluctuation because the high-temperature heat treatment is performed after the solid-phase polymerization at a temperature higher than the temperature of the solid-phase polymerization. When the deposit is rolled up and remains on final products, it may deposit on a weaving machine guide, etc., as causing troubles of defective running or yarn breakage. Thus oil for the solid-phase polymerization should be washed away during unrolling after solid-phase polymerization, however, the washing may reduce the oil function of reducing frictional resistance. That may cause the running tension rising and fibrillation, and therefore take-up of the solid-phase polymerized yarn may be further disadvantageous.

Thus, though the technologies, which are disclosed in Patent documents 1-3, do not tend to expose a problem in a case of several tens of thousands meters, local malfunctions may occur in a longitudinal direction of fibers if continuous throughput increases. That occurs for the reason that fibers after the solid-phase polymerization are unrolled and are once taken up.

Patent documents 1 and 3 refer to the high-temperature heat treatment by a phrase "it can be continued as unrolling fibers from the package", and they refer to the unrolling by a phrase "the package, which has been polymerized in solid phase, is preferably rotated by active driving". The running speed is not constant if the package, which has been polymerized in solid phase, is rotated as described above. Therefore in such a condition, when the unrolling and the high-temperature heat treatment are performed successively the heat treatment speed does not become constant so as to generate unevenness of strength and abrasion resistance in a lengthwise direction. In addition, because fluctuation of tension for unrolling affects the high-temperature heat treatment process directly, so that the tension fluctuates and troubles, such as yarn breakage and fineness malfunction, are caused.

Patent document 1 discloses neither a washing of oil which is polymerized in solid phase nor a successive unrolling-heat treatment of an oil-free yarn which is polymerized in solid phase. Though Patent document 3 discloses the washing, it does not disclose the successive unrolling-heat treatment as a technical suggestion. In addition, in processes disclosed in Patent documents 1-3, treated fibers are taken up in each step, so that the rise of cost, such as the take-up equipment cost and the labor cost for driving workers, has been unavoidable.

As described above, conventional technologies have not suggested a method for producing liquid crystal polyester fibers, which have a high strength, a high elastic modulus, a high thermal resistance and a high abrasion resistance, without fibril defects in low cost and good yield.

PRIOR ART DOCUMENTS

Patent Documents

Patent document 1: JP2008-240228-A
Patent document 2: JP2008-240230-A
Patent document 3: WO2008/105439

Non-Patent Documents

Non-patent document 1: "Reforming technology and the latest applications of liquid crystal polymer", edited by Technical information institute, Co., Ltd, pp. 235-256(2006)

SUMMARY OF THE INVENTION

Problems to be Solved by the Invention

An object of the present invention is to provide liquid crystal polyester fibers, having high strength, high elastic modulus, high thermal resistance and excellent abrasion resistance without problem in weavability and fabric quality, which do not have any fibril defect and which are excellently uniform in the lengthwise direction. Furthermore, it is to provide a method for producing excellent liquid crystal polyester fibers at low cost and high yield.

Means for Solving the Problems

To achieve the above-described object, liquid crystal polyester fibers according to the present invention are liquid crystal polyester fibers characterized by having a peak half-width of 15° C. or greater at an endothermic peak (Tm1) observed by differential calorimetry under a temperature elevation of 20° C./minute from 50° C., polystyrene equivalent weight average molecular weight of 250,000 or more and 2,000,000 or less, and a variable waveform of less than 10% in terms of half inert diagram mass waveform determined by a Uster yarn irregularity tester.

Further, a method according to the present invention is a method for producing liquid crystal polyester fibers wherein liquid crystal polyester fibers are formed into a package, the fibers are then subjected to solid-phase polymerization, and solid-phase polymerized liquid crystal polyester fibers are unrolled from the package and successively heat treated without being once taken up, characterized in that a temperature of the heat treatment is controlled at a temperature of an endothermic peak temperature (Tm1) of the solid-phase polymerized liquid crystal polyester fibers+60° C. or higher, and speeds of the fibers before and after heat treatment are regulated, respectively, by a first roller and a second roller.

Effect According to the Invention

Liquid crystal polyester fibers according to the present invention have a high strength, high elastic modulus, high thermal resistance and high abrasion resistance, as being excellent in an abrasion resistance and uniformity in fiber lengthwise direction. In addition, liquid crystal polyester fibers according to the present invention are excellent in process passability in a higher-order fabric processing such as weaving, and also excellent in weavability and growth of weaving density, and therefore fabrics having excellent fabric quality can be provided. Specifically, the fabrics can be improved in quality for filters and screen gauzes, which are high-mesh woven fabrics, by growth of weaving density (making a mesh higher), by extending an opening area, by reducing the opening defects and by improving weaving productivity.

A method for producing liquid crystal polyester fibers according to the present invention makes it possible to produce liquid crystal polyester fibers, which have high strength, high elastic modulus, high thermal resistance and high abrasion resistance without any fibril defect and which are excellently uniform in the lengthwise direction, at low cost and high yield.

EMBODIMENTS FOR CARRYING OUT THE INVENTION

Hereinafter, liquid crystal polyester fibers according to the present invention will be explained in detail.

The liquid crystal polyester used in the present invention means a polyester, capable of forming an anisotropic melting phase (liquid crystallinity) when molten. This property can be recognized, for example, by placing a sample of liquid crystal polyester on a hot stage, heating it in a nitrogen atmosphere, and observing a transmitted light of the sample under a polarized radiation.

The liquid crystal polyester used in the present invention can be exemplified as follows: a) a polymer of an aromatic oxycarboxylic acid; b) a polymer prepared from an aromatic dicarboxylic acid, an aromatic diol and/or an aliphatic diol; c) a copolymer of a) and b). A wholly aromatic polyester, which has not been prepared from an aliphatic diol, is preferred for achieving high strength, high elastic modulus and high thermal resistance.

The aromatic oxycarboxylic acid may be hydroxy benzoic acid, hydroxy naphthoic acid, etc., and may be alkyl, alkoxy or halogen substitution product, of the above-described aromatic oxycarboxylic acid.

The aromatic dicarboxylic acid may be terephthalic acid, isophthalic acid, diphenyl dicarboxylic acid, naphthalene dicarboxylic acid, diphenylether dicarboxylic acid, diphenoxyethane dicarboxylic acid, diphenylethane dicarboxylic acid, etc., and may be alkyl, alkoxy or halogen substitution product, of the above-described aromatic dicarboxylic acid.

The aromatic diol, hydroquinone may be resorcinol, dioxydiphenyl, naphthalene diol, etc., and may be alkyl, alkoxy or halogen substitution product, of the above-described aromatic diol. As the aliphatic diol, ethylene glycol, propylene glycol, butane diol, neopentyl glycol, etc., can be exemplified.

A copolymer of p-hydroxy benzoic acid component, 4,4'-dihydroxy biphenyl component, hydroquinone component, terephthalic acid component and/or is ophthalic acid component, a copolymer of p-hydroxy benzoic acid component and 6-hydroxy 2-naphthoic acid component, a copolymer of p-hydroxy benzoic acid component, 6-hydroxy 2-naphthoic acid component, hydroquinone component and terephthalic acid component, etc., are preferable as a liquid crystal polyester in the present invention, for achieving excellent spinnability, high strength and high elastic modulus, and for improving abrasion resistance by high-temperature heat treatment after solid-phase polymerization.

In the present invention, in particular, it is preferred that the liquid crystal polyester comprises the following structural units (I), (II), (III), (IV) and (V). Besides, "structural unit" means a unit capable of composing a repeated structure in a main chain of a polymer in the present invention.

[Chemical formula 1]

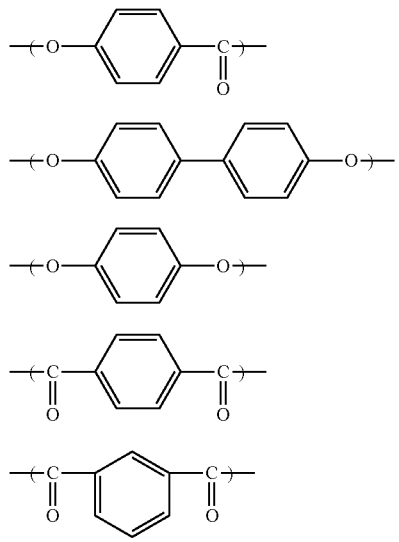

This combination of the structural units makes it possible for the molecular chain of a polymer to have a crystallinity and a non-linearity, namely, a melting point capable of being melt spun. Therefore, a good spinnability can be exhibited at a spinning temperature set between the melting point and the thermal decomposition temperature of the polymer, as providing fibers uniform in the lengthwise direction, and because of an appropriate crystallinity, the strength and elastic modulus of the fibers can be increased.

Specifically, it is possible to combine components of diols with a high linearity and a small bulk in structural units (II) and (III), so that the molecular chain in the fiber can have an orderly structure with less disorder, and an interaction in a direction perpendicular to the fiber axis can be maintained because the crystallinity is not increased excessively. In addition to obtaining high strength and elastic modulus by this, a particularly excellent abrasion resistance can be obtained by carrying out a heat treatment at a high temperature.

The proportion of the above-described structural unit (I) is preferably 40 to 85 mol %, more preferably 65 to 80 mol %, further preferably 68 to 75 mol %, relative to the sum of the structural units (I), (II) and (III). By control in such a range, the crystallinity can be controlled in an adequate range, high strength and elastic modulus can be obtained, and the melting point can be controlled in a range capable of performing a melt spinning.

The proportion of the structural unit (II) is preferably 60 to 90 mol %, more preferably 60 to 80 mol %, further preferably 65 to 75 mol %, relative to the sum of the structural units (II) and (III). In such a range, since the crystallinity does not increase excessively and the interaction in a direction perpendicular to the fiber axis can be maintained, the abrasion resistance can be improved by carrying out a heat treatment at a high temperature after solid-phase polymerization.

The proportion of the structural unit (IV) is preferably 40 to 95 mol %, more preferably 50 to 90 mol %, further preferably 60 to 85 mol %, relative to the sum of the structural units (IV) and (V). In such a range, the melting point of the polymer can be controlled in an adequate range, a good spinnability can be exhibited at a spinning temperature set between the melting point and the thermal decomposition temperature of the polymer, as providing fibers which are uniform in the lengthwise direction. Since the crystallinity of the polymer does not increase excessively and the linearity of the molecular chain loosens appropriately, the interaction in a direction perpendicular to the fiber axis can be enhanced and the abrasion resistance can be improved by carrying out a heat treatment at a high temperature after solid-phase polymerization.

Preferred ranges of the respective structural units of the liquid crystal polyester used in the present invention are as follows. The liquid crystal polyester fibers according to the present invention can be suitably obtained by controlling the composition in these ranges so as to satisfy the above-described condition of the structural units (I), (II) and (IV).

Structural unit (I): 45-65 mol %
Structural unit (II): 12-18 mol %
Structural unit (III): 3-10 mol %
Structural unit (IV): 5-20 mol %
Structural unit (V): 2-15 mol %

Aromatic dicarboxylic acid such as 3,3'-diphenyl dicarboxylic acid or 2,2'-diphenyl dicarboxylic acid, aliphatic dicarboxylic acid such as adipic acid, azelaic acid, sebacic acid or dodecanedionic acid, alicyclic dicarboxylic acid such as hexahydro terephthalic acid (1,4-cyclohexane dicarboxylic acid), aromatic diol such as chloro hydroquinone, 4,4'-dihydroxy phenylsulfone, 4,4'-dihydroxy diphenylsulfide or 4,4'-dihydroxy benzophenone and p-aminophenol can be copolymerized in a range of about 5 mol % or less that does not impair the advantages of the present invention, in addition to the above-described structural units in the liquid crystal polyester for the present invention.

Further, in a range of about 5 wt % or less that does not impair the advantages of the present invention, another polymer can be added, such as a polyester, a vinyl-group polymer such as a polyolefine or a polystyrene, a polycarbonate, a polyamide, a polyimide, a polyphenylene sulfide, a polyphenylene oxide, a polysulfone, an aromatic polyketone, an aliphatic polyketone, a semi-aromatic polyester amide, a polyetheretherketone, or a fluoro resin. Furthermore, polyphenylene sulfide, polyetherketone, nylon 6, nylon 66, nylon 46, nylon 6 T, nylon 9 T, polyethylene terephthalate, polypropylene terephthalate, polybutylene terephthalate, polyethylene naphthalate, polycyclohexane dimethanol terephthalate, polyester 99M, etc, can be added. Where, melting points of these polymers are preferably set within the melting point of the liquid crystal polyester±30° C.

In liquid crystal polyester fibers according to the present invention, a small amount of various additives may be contained, such as an inorganic substance such as various metal oxides, kaoline and silica, a colorant, a delustering agent, a flame retardant, an anti-oxidant, an ultraviolet ray absorbent, an infrared ray absorbent, a crystal nucleus agent, a fluorescent whitening agent, an end group closing agent, a compatibility providing agent, etc.

The weight average molecular weight of the liquid crystal polyester fibers according to the present invention determined through a polystyrene-equivalent weight average molecular weight (hereinafter, referred to as merely "a molecular weight") is in a range of 250,000 or more and 2,000,000 or less. By having a high molecular weight of 250,000 or more, high strength, elastic modulus and elongation are given. Because the strength, elastic modulus and elongation are increased as the molecular weight becomes higher, it is preferably 300,000 or more, and more preferably 350,000 or more, and further preferably 400,000 or more. Where, the molecular weight called in the present invention means a value determined by the method described in Example.

In the liquid crystal polyester fibers according to the present invention, a half width of endothermic peak (Tm1) observed when measured under a condition of heating from 50° C. at a temperature elevation rate of 20° C./min in differential calorimetry is 15° C. or higher. Tm1 in this determination method represents a melting point of fiber, and the wider the area of the peak shape is, that is, the greater the heat of melting ($\Delta Hm1$) is, the higher the degree of crystallization is, and the smaller the half width is, the higher the completion of crystallinity is. In the liquid crystal polyester, by carrying out solid-phase polymerization after spinning, Tm1 elevates, $\Delta Hm1$ increases and the half width decreases, and by increasing the degree of crystallization and the completion of crystallinity, the strength, elongation and elastic modulus of the fibers are increased and the thermal resistance thereof is improved. On the other hand, the abrasion resistance deteriorates, probably because a difference in structure between the crystal part and the amorphous part becomes remarkable by increase of the completion of crystallinity so that destruction occurs in the interface therebetween. Accordingly, in the present invention, the crystallinity is decreased by increasing the half width of the peak up to a value of 15° C. such as one of a liquid crystal polyester fibers which are not carried out with solid-phase polymerization while maintaining a high Tm1 and high strength, elastic modulus, elongation and thermal resistance that are the features of fibers carried out with solid-phase polymerization, and the abrasion resistance can be improved by decreasing the difference in structure between the crystal/amorphous parts which becomes a trigger of the destruction. The peak half width at Tm1 in the present invention is preferably 20° C. or higher, because the higher width makes the higher abrasion resistance. And the upper limit is 80° C.

In the liquid crystal polyester fibers according to the present invention, depending upon the fiber structure such as a case of insufficient solid-phase polymerization, there may be a case where two or more peaks are observed. In such a case, the half width of peak is determined as a value of the sum of the half widths of the respective peaks.

In the liquid crystal polyester fibers according to the present invention, it is preferred that an exothermic peak substantially is not observed when measured in differential calorimetry under a condition of heating from 50° C. at a temperature elevation rate of 20° C./min. The phrase "an exothermic peak substantially is not observed" means that no peak is observed at an exothermic amount of 3.0 J/g or more, preferably 1.0 J/g or more, further preferably 0.5 J/g or more, where a fine or mild fluctuation is not deemed to be a peak. An exothermic peak is observed in a case where a crystalline polymer is contained in fibers at an amorphous state. Non-observation of exothermic peak means that fibers substantively consist of a single component of liquid crystal polyester. When the fibers consist substantively of a single component of liquid crystal polyester, the fibers can sufficiently exhibit the characteristics of liquid crystal polyester, and the fibers are excellent in strength, elastic modulus, thermal resistance and thermal dimensional stability.

The melting point (Tm1) of the liquid polyester fibers according to the present invention is preferably 290° C. or higher, more preferably 300° C. or higher, and further preferably 310° C. or higher. By having a high melting point, the thermal resistance as fibers is excellent. Although there is a process for yarn-making by liquid crystal polyester with a high melting point in order to achieve a high melting point of fiber, in order to obtain fibers further high in strength and elastic modulus and excellent in uniformity in the lengthwise direction, it is preferred to polymerize melt spun fibers in solid phase. Where, the melting point is preferably about 400° C. or less.

Further, the value of the heat of melting $\Delta Hm1$ varies depending upon the composition of the structural unit of the liquid crystal polyester. The value of the heat of melting $\Delta Hm1$ of the liquid crystal polyester fibers according to the present invention is preferably 6.0 J/g or less. By setting the $\Delta Hm1$ no more than 6.0 J/g, the degree of crystallization reduces, the fibril structure is disarrayed and the whole of the fiber is softened, and decreasing the difference in structure between the crystal/amorphous parts which becomes a trigger of the destruction, the abrasion resistance increases. The abrasion resistance improves if the $\Delta Hm1$ is 5.0 J/g or less. If the $\Delta Hm1$ is 0.5 J/g or higher, excellent strength and elastic modulus can be achieved.

The liquid crystal polyester with a molecular weight of 250,000 or more is remarkably high in viscosity and is not fluidized and is difficult in melt spinning even if it exceeds the melting point. Liquid crystal polyester fibers with such a high molecular weight can be obtained by melt spinning liquid crystal polyester with a low molecular weight and serving this fiber to solid-phase polymerization. When the liquid crystal polyester fibers are subjected to solid-phase polymerization, the molecular weight increases, the strength, elongation, elastic modulus and thermal resistance increase, and at the same time, the degree of crystallization also increases, the Tm1 increases, the half width decreases and the $\Delta Hm1$ increases. If the degree of crystallization increases, the strength, elongation, elastic modulus and thermal resistance further increase, but the difference in structure between the crystal part and the amorphous part becomes remarkable, the interface therebetween is liable to be destroyed, and the abrasion resistance decreases. Against the abrasion resistance decrease, in the present invention, the high strength, elastic modulus and thermal resistance can be maintained by having a high molecular weight that is a feature of fibers carried out with solid-phase polymerization, as well as the abrasion resistance can be increased by having a low degree of crystallization, that is, a low $\Delta Hm1$ by increasing the half width, such as that of liquid crystal polyester fibers which have not been carried out with solid-phase polymerization. The present invention achieved a technical advance where the abrasion resistance is improved by the structure change, which means decreasing the degree of crystallization.

Such a fiber structure can be achieved as a liquid crystal polyester fibers, which have been carried out with solid-phase polymerization, and are heat treated at a temperature of Tm1 of the liquid crystal polyester fiber plus 10° C. or higher while being run continuously.

Although the Tc, defined as a temperature at an exothermic peak which is observed when measured under a condition of a temperature lowering rate of 20° C./min, of the fiber according to the present invention varies depending upon the composition, in order to increase the thermal resistance, it is preferably 250° C. or higher and 350° C. or lower. As to a heat of crystallization ($\Delta Hc$) (J/g) at Tc, if $\Delta Hc$ is too low, the strength and elastic modulus decrease because of reduction of degree of crystallization, and if it is too high, the degree of crystallization becomes too high and it becomes difficult to improve the abrasion resistance, and therefore, it is preferably 2.0 J/g or more and 5.0 J/g or less. As to the exothermic peak at the time of cooling under the above-described measurement condition, there is a case where two or more peaks are observed depending upon the structural change due to the heat treatment after solid-phase polymerization, etc. $\Delta Hc$ in such a case is defined as a value of the sum of the $\Delta Hc$ of the respective peaks.

Further, Tm2, defined as an endothermic peak which is observed when measured under a condition of heating again at a temperature elevation rate of 20° C./min after cooled down to 50° C., of the fibers according to the present invention, varies depending upon the composition, and is preferably no less than 300° C. from a viewpoint of increasing the thermal resistance. It is more preferably 400° C. or lower. As to a heat of melting ($\Delta Hm2$) (J/g), if $\Delta Hm2$ is excessively great, because the crystallinity as a polymer itself becomes high, it becomes difficult to increase the abrasion resistance, therefore it is preferably 5.0 J/g or less, more preferably 2.0 J/g or less. As to the endothermic peak at the time of reheating after cooling under the above-described measurement condition, there is a case where two or more peaks are observed. $\Delta Hm2$ in such a case is defined as a value of the sum of the $\Delta Hm2$ of the respective peaks.

The liquid crystal polyester fibers according to the present invention have a variable waveform of less than 10% in terms of half inert diagram mass waveform, which will be called U % H hereinafter, determined by Uster yarn irregularity tester. The variable waveform at U % H is determined by the method in Example described later. The U % H makes it possible to detect an abnormal fiber diameter above 1 m of wavelength. For example, it can detect a higher fiber diameter which is observed in a case where accumulated fibrils mix in fibers. Because a lot of deposited fibrils do not mix all at once but by some steps, abnormal long cycle may be detected. Also it can detect an abnormal fiber diameter which is observed in a case where fibrils adherent to the roll before a high-temperature heat treatment so that running becomes unstable. It may cause an abnormally long pitch as long as a heater length. Because the liquid crystal polyester fibers have a variable waveform of less than 10%, the fiber diameter is uniform along lengthwise direction, without abnormality of long pitch caused by fiber whittlings or fibrillation. Because fiber diameter is uniform in this way along the lengthwise direction, the process passability and weavability in the higher-order process such as weaving improve, and the fiber opening becomes uniform in a woven fabric as improving fabric quality. The smaller the variable waveform is, the higher the uniformity along the fiber lengthwise direction is, and therefore is preferably less than 8%.

It is preferable that a value of variable at an outer diameter measurement is less than 30% in the liquid crystal polyester fibers according to the present invention. The value of variable at an outer diameter measurement referred to in the present invention means a value determined by a method described in Example. The outer diameter measurement makes it possible to detect an abnormal fiber diameter around some cm of wavelength. For example, it can detect a lower fiber diameter which is caused by local fiber whittlings and also detect a higher fiber diameter which is caused by fibril mixing. A short abnormal pitch is observed when the mixing precedes much deposition. When the value of variable at an outer diameter measurement is less than 30%, the fiber diameter is uniform along a lengthwise direction even if the pitch is shorter. Therefore the process passability at a higher-order process such as weaving and the weaving performance are improved, so as to improve a fabric quality. The smaller the value of variable at an outer diameter measurement is, the higher the uniformity along the fiber lengthwise direction is, and therefore is preferably less than 20%, more preferably less than 15%.

The uniformity in a fiber diameter along fiber lengthwise direction is what is emphasized specifically in a screen gauze for printing and a mesh woven fabric for filter, which comprise monofilaments. When such a woven fabric is continuously produced into tens of meters length, a latitude yarn is required in a length of hundreds of thousand meters. As described in the section of background, longer yarn, which is specifically longer than 150,000 m, affects the take-up of solid-phase polymerized fibers to make the uniformity of fiber diameter worsen in Patent documents 1-3. In contrast, the present invention can omit the take-up itself of the solid-phase polymerization, so that uniform fibers are obtained and woven fabrics with continuous tens of meters length can be improved in quality. If there is abnormally long pitch especially expressed by U % H, defects of several meters appear and product loss increases in an application requiring a mesh with several meters angle. The liquid crystal polyester fibers according to the present invention, which do not cause abnormally long pitch expressed by U % H, do not cause continuous abnormality in woven fabrics so as to suppress the product loss at minimum.

In order to increase the strength of woven fabrics, the strength of the liquid crystal polyester fibers according to the present invention is preferably 12.0 cN/dtex or more, more preferably 14.0 cN/dtex or more, further preferably 15.0 cN/dtex or more, and particularly preferably 18.0 cN/dtex or more. The upper limit thereof is 30.0 cN/dtex. Where, the strength referred to in the present invention indicates a tensile strength described in JIS L1013:1999.

In order to increase the strength of woven fabrics, the elastic modulus is preferably 500 cN/dtex or more, more preferably 600 cN/dtex or more, and further preferably 700 cN/dtex or more. The upper limit of the elastic modulus is 1200 cN/dtex. Where, the elastic modulus referred to in the present invention indicates an initial tensile resistance degree described in JISL1013:1999.

It can be suitably used in applications, such as ropes, fibers for reinforcing members such as a tension member, screen gauzes for printing and mesh woven fabrics for filter, because of its high strength and elastic modulus. Also because a high tenacity can be exhibited even by small fiber fineness, it can be achieved to make a fibrous material smaller in weight and thickness, and a yarn breakage in a higher-order processing process such as weaving can also be suppressed. In the liquid crystal polyester fibers according to the present invention, high strength and elastic modulus can be obtained by the condition where the molecular weight is 250,000 or more.

It is preferred that the single-fiber fineness of the liquid crystal polyester fibers according to the present invention is 18.0 dtex or less. By making the fibers thinner at a single-fiber fineness of 18.0 dtex or less, the molecular weight easily increases when polymerized in solid phase at fibrous state, as providing advantages that the flexibility of the fibers increases and the processability of the fibers is improved, that the surface area increases and therefore the adhesion property thereof with chemicals such as an adhesive is improved, and in case of being formed as a gauze comprising monofilaments, that the thickness can be thinner, that the weaving density can be increased, and that the opening (area of the opening portions) can be widened. The single-fiber fineness is more preferably 10.0 dtex or less, and further preferably 7.0 dtex or less. The lower limit of the single-fiber fineness is 1.0 dtex.

The fluctuation rate of the fineness of the liquid crystal polyester fibers according to the present invention is preferably 30% or less, more preferably 20% or less, further preferably 10% or less. The fluctuation rate of the fineness referred to in the present invention means a value determined by the method in Example described later. By the fluctuation rate of the fineness at 30% or less, because the uniformity along the lengthwise direction is improved and the fluctuation of the tenacity of the fibers (product of strength and fineness) is also decreased, defects of a fiber product decrease. In addition, because the fluctuation of the diameter becomes smaller in case of monofilament, the uniformity of the opening (area of opening portion) when formed as a gauze is enhanced and the performance of the gauze can be improved.

The fluctuation rate of the tenacity of the liquid crystal polyester fibers according to the present invention is preferably 20% or less, more preferably 15% or less. The tenacity, referred to in the present invention, indicates strength at the time of breakage in the measurement of tensile strength described in JISL1013:1999. The fluctuation rate of the tenacity indicates a value determined by the method in Example described later. By the fluctuation rate of the tenacity at 20% or less, because the uniformity along the lengthwise direction is improved, defects of a fiber product decrease. In addition, yarn breakage derived from a low strength portion in a higher-order processing process can also be suppressed.

The elongation of the liquid crystal polyester fibers according to the present invention is preferably 1.0% or more, more preferably 2.0% or more. By the elongation of 1.0% or more, the impact absorbability of the fibers is improved, the process passability in a higher-order processing process and the handling ability are excellent. In addition, because the impact absorbability is improved, the abrasion resistance is also improved. The upper limit of the elongation is 10.0%. High elongation can be achieved in the liquid crystal polyester according to the present invention, because the molecular weight is 250,000 or more.

The compression elastic modulus in a direction perpendicular to the fiber axis (hereinafter, referred to as "compression elastic modulus") of the liquid crystal polyester fibers according to the present invention is preferably 0.50 GPa or less. Although the liquid crystal polyester fibers according to the present invention have high strength and elastic modulus in a tensile direction, by the low compression elastic modulus, when the fibers are pushed onto a guide or a reed in a higher-order processing process or a weaving machine, an advantage for dispersing the load by enlarging the contact area can be exhibited. By this advantage, the pushing stress to the fibers is decreased, and the abrasion resistance is improved. If the compression elastic modulus is 0.10 GPa or more, the fibers are not greatly deformed by being pushed, and the gauze thickness, when used as a screen gauze for printing, can be kept at a high level, and therefore the quality of the gauze is not impaired. Where, the compression elastic modulus referred to in the present invention indicates a value determined by the method in Example described later.

The birefringence ($\Delta n$) of the liquid crystal polyester fibers according to the present invention is preferably 0.250 or more and 0.450 or less. The molecular orientation in the fiber axis direction is sufficiently high, and high strength and elastic modulus can be obtained.

In the liquid crystal polyester fibers according to the present invention, a half width ($\Delta 2\theta$) of a peak observed in an equator line at $2\theta=18$ to $20°$ relative to the fiber axis in a wide angle X-ray diffraction is preferably $1.8°$ or more, more preferably $2.0°$ or more, and further preferably $2.2°$ or more. Although generally $\Delta 2\theta$ becomes greater accompanying with decrease of crystal size in crystalline polymer, in liquid crystal polyester, because a stacking of phenylene ring gives diffraction, it is considered that, if the contribution due to a disturbance of the stacking is great, $\Delta 2\theta$ becomes greater. In liquid crystal polyester, the stacking structure is stabilized accompanying with solid-phase polymerization and crystallization proceeds, and therefore, $\Delta 2\theta$ decreases. By the great $\Delta 2\theta$ of $1.8°$ or more, the crystallinity is reduced and the whole of the fiber becomes flexible, and by reduction of the difference in structure between crystal/amorphous parts that becomes a trigger of breakage, the abrasion resistance is improved. The upper limit of $\Delta 2\theta$ is $4.0°$. Where, $\Delta 2\theta$ referred to in the present invention indicates a value determined by the method in Example described later.

It is preferred for an oil to be applied to adhere to the fibers obtained in the present invention in order to increase of the abrasion resistance and to improve a process passability, due to improve a flatness of surface. The amount of oil adhesion is preferably 0.05 wt % or more relative to the weight of the fiber, and is more preferably 0.1 wt % or more. Where, the amount of oil adhesion referred to in the present invention means a value determined by the method in Example described later. However, if the oil amount is too much, there occur problems such as a problem that the adhesive force between fibers increases and the running tension becomes unstable, and a problem that oil is accumulated on a guide and the like, the process passability deteriorates and as the case may be, the oil is mixed in a product to cause defects, and therefore, the amount is preferably 2.0 wt % or less, more preferably 1.0 wt % or less, further preferably 0.9 wt % or less.

The oil to adhere can be of kind which is generally used. As for a liquid crystal polyester fiber, it is preferred to use at least a polysiloxane-group compound having both the advantages of fusion-bonding prevention in solid-phase polymerization and improvement of surface flatness, and in particular, it is preferred to contain a polysiloxane-group compound with a liquid phase at a room temperature (silicone oil) which is easy to be applied to the fiber, particularly a polydimethylsiloxane-group compound suitable to water emulsification and low in environmental load. The determination, whether the polysiloxane-group compound is contained, is carried out in the present invention by the method in Example described later.

The abrasion resistance C of the liquid crystal polyester fibers according to the present invention is preferably 20 seconds or more, more preferably 50 seconds or more, further preferably 60 seconds and particularly preferably 70 seconds. The abrasion resistance C referred to in the present invention indicates a value determined by the method in Example described later. By the abrasion resistance C of 20 seconds or more, fibrillation of liquid crystal polyester fibers at a higher-order processing process can be suppressed, and deterioration of the passability and weaving property, as well as a clogging of an opening due to accumulated fibrils being woven, can be suppressed. Further, because deposition of fibrils onto a guide and the like decreases, the cycle for cleaning or exchange can be lengthened.

Further, in the liquid crystal polyester fibers according to the present invention, the flexion abrasion resistance is preferably 6 times or more, more preferably 10 times or more, further preferably 15 times or more, particularly preferably 20 times or more, and most preferably 30 times or more. The flexion abrasion resistance referred to in the present invention indicates a value determined by the method in Example described later. By the flexion abrasion resistance of 6 times or more, fibrillation of a liquid crystal polyester fibers at a higher-order processing process and particularly the fibrillation when the fibers are bent for being distributed can be suppressed, so that the process passability can be improved. In addition, because deposition of fibrils onto a metal guide and the like decreases, the cycle for cleaning or exchange can be lengthened.

The number of filaments of the liquid crystal polyester fibers according to the present invention is, in order to make a fiber product thinner or lighter in weight, preferably 50 or less, more preferably 20 or less. In particular, because a monofilament, whose filament number is one, is a usage field which strongly requires for high fiber fineness, high strength, high elastic modulus and high uniformity of single-fiber fineness, the fibers according to the present invention can be used particularly suitably.

The total fineness of the liquid crystal polyester fibers according to the present invention is preferably 100 dtex or less, more preferably 50 dtex or less, from a viewpoint of thinner and lighter woven fabrics. Particularly in a case of screen gauze made of monofilaments, the total fineness is preferably lower because finer printing can be achieved by lower total fineness.

The yarn length of the liquid crystal polyester fibers according to the present invention is preferably 150,000 m or more. Such a long yarn can make the weaving length longer when used as a latitudinal fiber of woven fabrics. In addition, volumes thereof can be reduced when products are transported. The longer the yarn length is, the more such effects can be enhanced, and therefore the yarn length is more preferably 200,000 m or more. Because the liquid crystal polyester fibers according to the present invention have a long yarn length, the fibers are preferably wound around a core member, so as to form a package. Because monofilaments tend to collapse from an end surface, such a package preferably has a shape with tapered end surface, and more preferably is taper-end-cheese winding or pirn winding. The taper angle is preferably 70° or less, and is more preferably 60° or less. The end surface may collapse if the taper angle is too large. Further, in case where the taper angle is too small, the winding amount cannot be made large, and therefore the taper angle is preferably 30° or more, more preferably 40° or more. Where, the taper angle referred to in the present invention is defined by the following equation (Equation 1).

$$\theta = \tan^{-1}\{2d/(li-lo)\} \qquad \text{[Equation 1]}$$

θ: taper angle (°)
d: winding thickness (mm)
li: stroke of innermost layer (mm)
lo: stroke of outermost layer (mm)

Hereinafter, examples of production of the liquid crystal polyester fibers according to the present invention will be explained in detail.

As the process for producing liquid crystal polyester used in the present invention, a process based on a known process can be employed, and for example, the following production process is preferably exemplified.

(1) A process for producing liquid crystal polyester by deacetic condensation polymerization from a diacetylate of an acetoxy carboxylic acid such as p-acetoxy benzoic acid and an aromatic dihydroxy compound such as 4,4'-diacetoxy biphenyl or diacetoxy benzene and an aromatic dicarboxylic acid such as terephthalic acid or isophthalic acid.

(2) A process for producing a liquid crystal polyester by deacetic condensation polymerization, after acylating a phenolic hydroxyl group by reaction of acetic anhydride to a hydroxy carboxylic acid such as p-hydroxy benzoic acid and an aromatic dihydroxy compound such as 4,4'-dihydoxy biphenyl or hydroquinone and an aromatic dicarboxylic acid such as terephthalic acid or isophthalic acid.

(3) A process for producing a liquid crystal polyester by dephenolic condensation polymerization from a diphenyl ester of a phenyl ester of a hydroxy carboxylic acid such as p-hydroxy benzoic acid and an aromatic dihydroxy compound such as 4,4'-dihydoxy biphenyl or hydroquinone and an aromatic dicarboxylic acid such as terephthalic acid or isophthalic acid.

(4) A process for producing a liquid crystal polyester by dephenolic condensation polymerization, after reacting a predetermined amount of diphenyl carbonate to a hydroxy carboxylic acid such as p-hydroxy benzoic acid and an aromatic dicarboxylic acid such as terephthalic acid or isophthalic acid, forming respective diphenyl esters, and adding an aromatic dihydroxy compound such as 4,4'-dihydoxy biphenyl or hydroquinone.

Among these processes, preferred is the process for producing a liquid crystal polyester by deacetic condensation polymerization, after acylating a phenolic hydroxyl group by reaction of acetic anhydride to a hydroxy carboxylic acid such as p-hydroxy benzoic acid and an aromatic dihydroxy compound such as 4,4'-dihydoxy biphenyl or hydroquinone and an aromatic dicarboxylic acid such as terephthalic acid or isophthalic acid. Further, the amount (mol) of the sum of the used aromatic dihydroxy compound such as 4,4'-dihydroxy biphenyl or hydroquinone is preferably substantively the same as the amount (mol) of the sum of the used aromatic dicarboxylic acid such as terephthalic acid or isophthalic acid. The amount of the used acetic anhydride is preferably 1.12 equivalent of the sum of the phenolic hydroxyl group of 4,4'-dihydroxy biphenyl or hydroquinone or less, more preferably 1.10 equivalent or less, and the lower limit is preferably 1.00 equivalent or more.

When the liquid crystal polyester used in the present invention is produced by deacetic condensation polymerization, a melt polymerization process is preferred wherein the reaction is carried out under a pressure reduced condition at a temperature which causes melting of a liquid crystal polyester and the condensation polymerization is completed. Such a process makes it possible to produce a uniform polymer as generating less amount of gas, so that polymers which are excellent in spinnability are obtained. For example, a process is exemplified wherein predetermined amounts of hydroxy carboxylic acid such as p-hydroxy benzoic acid, aromatic dihydroxy compound such as 4,4'-dihydroxy biphenyl or hydroquinone, aromatic dicarboxylic acid such as terephthalic acid or isophthalic acid and acetic anhydride are charged into a reaction vessel with an agitator and a fraction tube and with a discharge port at a lower part, and heated to acetylate the hydroxylic group while agitated in a nitrogen atmosphere, and thereafter, heated up to a melting temperature of the liquid crystal resin, and it is condensation polymerized by reducing pressure to complete the reaction. As to the acetylation condition, it is reacted usually in a range of 140-180° C., for 1 to 6 hours. The temperature for the polycondensation is a melting temperature of a liquid crystal polyester, for example, in a range of 250-350° C., preferably "the melting point of the liquid crystal polyester polymer"+10° C. or higher. The degree of the pressure reduction at the time of polycondensation is usually 665 Pa or lower.

The obtained polymer can be discharged in a strand shape from the discharge port provided at a lower part of the reaction vessel by pressurizing the inside of the reaction vessel at a temperature for melting it, for example, at about 0.1±0.05 MPa.

When the liquid crystal polyester for the present invention is produced, it is also possible to complete the condensation polymerization by solid-phase polymerization. For example, a process is exemplified wherein a liquid crystal polyester polymer or oligomer is ground by a grinder, it is heated in a nitrogen gas flow or under a pressure reduced condition at a temperature from the melting point of liquid crystal polyester [Tm]−5° C. to the melting point [Tm]−50° C. (for example, in a range from 200 to 300° C.) for 1 to 50 hours, and it is condensation polymerized up to a desired polymerization degree to complete the reaction.

In a spinning, however, if the liquid crystal polymer produced by solid-phase polymerization is used as it is, a high crystallized part produced by the solid-phase polymerization remains at a condition unmelted, because there is a possibility that it causes an elevation of spinning pack pressure or a foreign matter in a yarn, it is preferred to once blend it by a biaxial extruder and the like (re-pelletize) to completely melt the high crystallized part.

Although the above-described condensation polymerization of the liquid crystal polyester proceeds even without catalyst, a metal compound, such as stannous acetate, tetrabutyltitanate, potassium acetate and sodium acetate, antimony trioxide or metal magnesium, can be also used.

The melting point of the liquid crystal polyester polymer for the present invention is preferably from 200 to 380° C. in order to widen the temperature range capable of melt spinning. It is more preferably from 250 to 360° C. in order to enhance the spinnability, further preferably from 250 to 350° C., and most preferably from 280 to 330° C. Where, the melting point of the liquid crystal polyester polymer means a value determined by the method in Example described later.

The melt viscosity of the liquid crystal polyester polymer for the present invention is from 0.5 to 200 Pa·s, preferably from 1 to 100 Pa·s in order to achieve high spinnability, and more preferably from 1 to 50 Pa·s. Where, this melt viscosity is a value measured by a drop type flow tester at conditions of a temperature of melting point (Tm)+10° C. and a shear speed of 1,000 (1/s).

It is preferred that the weight average molecular weight of the liquid crystal polyester for the present invention determined through a polystyrene-equivalent weight average molecular weight (hereinafter, referred to as merely "a molecular weight") is preferably 30,000 or more, more preferably 50,000 or more. By having a molecular weight of 50,000 or more, at a spinning temperature an adequate viscosity can be provided and the spinnability can be improved, and as the molecular weight is higher, the strength, elongation and elastic modulus of the fibers can be increased. If the molecular weight is too high, the viscosity becomes high and the flowability deteriorates, and ultimately it becomes impossible to flow, and therefore, the molecular weight is preferably less than 250,000, more preferably less than 150,000.

It is preferable that the liquid crystal polyester for the present invention is dried up before being subjected to melt spinning, from a viewpoint of suppressing foaming caused by water mixture and of enhancing spinnability. It is more preferable that vacuum drying is performed, because the monomer which remains in the liquid crystal polyester can be removed, so that spinnability is further enhanced. The vacuum drying is usually performed for 8-24 hours at 100-200° C.

In the melt spinning, although a known method can be employed for melt extrusion of liquid crystal polyester, in order to prevent a systematic structure from being produced at the time of polymerization, an extruder-type extruding machine is preferably used. The extruded polymer is metered by a known metering device such as a gear pump through a flow path, and after passing through a filter for removing foreign matters, it is introduced into a die. At that time, the temperature (spinning temperature) from the polymer flow path to the die is controlled preferably at a temperature of the melting point of the liquid crystal polyester, more preferably at a temperature of the melting point of the liquid crystal polyester+10° C. or higher. Besides, if the spinning temperature is too high, the viscosity of the liquid crystal polyester may increase so as to deteriorate fluidity and spinnability, and therefore, it is preferably 500° C. or lower, more preferably 400° C. or lower. Where, it is also possible to adjust the respective temperatures from the polymer flow path to the die independently. In this case, the discharge can be stabilized by controlling the temperature of a portion near the die higher than the temperature of an upstream portion thereof.

As to the discharge, it is important to make the hole diameter of the die smaller and to make the land length (a length of a straight part having the same length of the hole diameter of the die) longer, from a viewpoint of enhancing spinnability and uniformity of fineness. However, if the hole diameter is excessively small, because a clogging of a hole is liable to occur, the diameter is preferably 0.03 mm or more, and 0.30 mm or less, and is more preferably 0.08 mm or more, and 0.20 mm or less. If the land length is excessively great, because the pressure loss becomes high, L/D defined as a quotient calculated by dividing the land length with the hole diameter is preferably 0.5 or more and 3.0 or less, and is more preferably 0.8 or more and 2.5 or less.

Further, in order to keep the uniformity, the number of holes in a single die is preferably 50 holes or less, and is more preferably 20 holes or less. Where, the introduction hole positioned immediately above the die holes is preferably a straight hole, from the point of preventing increase of the pressure loss. The connecting portion between the introduction hole and the die holes is preferably formed in a taper shape from the viewpoint of suppressing an abnormal staying.

The polymer discharged from the die holes passes through heat insulating and cooling regions and is solidified, and thereafter, is drawn up by a roller (a godet roller) rotating at a constant speed. If the heat insulating region is excessively long, because the spinnability deteriorates, it is preferably 200 mm or less from the die surface, and is more preferably 100 mm or less. In the heat insulating region, it is possible for the atmosphere temperature to be raised by using a heating means, and its temperature range is preferably 100° C. or higher and 500° C. or lower, and is more preferably 200° C. or higher and 400° C. or lower. Although inert gas, air, steam, etc. can be used for the cooling, it is preferred to use an air flow blown in parallel or annularly, from the viewpoint of lowering the environment load.

The draw speed is preferably 50 m/min or more for improving the productivity and decreasing the single-yarn fineness, and is more preferably 500 m/min or more. Since the liquid crystal polyester, which was exemplified as a desirable embodiment in the present invention, has a good yarn-drawing property at a spinning temperature, the draw speed can be set high, up to 2000 m/min.

The spinning draft defined as a quotient calculated by dividing the discharge linear speed with the draw speed is preferably 1 or more and 500 or less, and is more preferably 10 or more and 100 or less for enhancing the spinnability and uniformity of fineness.

In the melt spinning, it is preferred to apply an oil at a position between the cooling to solidify the polymer and the take-up, from the viewpoint of improving the handling property of the fiber. Although a known oil can be used, it is preferred to use a water emulsion of a lubricating agent whose main constituent is polyether compound, and an emulsifying agent whose main constituent is lauryl alcohol, from a viewpoint of improving the unrolling when a fiber (hereinafter called original yarn of spinning), which is obtained by the melt spinning at the roll-back before the solid-phase polymerization, is unrolled.

Although the take-up can be carried out by using a known winder and forming a package such as a pirn, a cheese, a cone, etc., a pirn winding, in which a roller does not come into contact with a package surface at the time take-up, is preferable, from the viewpoint of not giving a friction to the fibers and not fibrillating it.

The liquid crystal polyester fibers according to the present invention, whose molecular weight is 250,000 or more and 2,000,000 or less, are obtained by polymerising the original yarn of spinning at the solid phase. The solid-phase polymerization can increase the molecular weight so as to increase the strength, elastic modulus and elongation. The solid-phase polymerization can be carried out at a state of a package, a hank or a tow (for example, carried out on a metal net and the like), or can be carried out at a yarn state continuously between rollers, and it is preferably carried out at a package state, where the fibers are taken up into a core member, from the viewpoint of simplifying the apparatus and improving the productivity.

In case where the solid-phase polymerization is carried out at a package state, a technology for preventing fusion-bonding, that becomes remarkable when the single-fiber fineness is made small, becomes important. Therefore, the solid-phase polymerization is preferably performed in a condition where the winding density of the fiber package is small. On the other hand, when the winding density is too small, winding collapses of the package or traverse failures at the end surface may cause a tension fluctuation or a yarn breakage when the fibers are unrolled at a constant speed after the solid-phase polymerization. Therefore, in order to obtain liquid crystal polyester fibers according to the present invention, it becomes important to obtain a package, of which winding density is small and which has few winding collapses and few traverse failures.

Though forming such a package by take-up in melt spinning is desirable because the productivity for apparatus and the efficiency of production can be improved, forming it by rolling the original yarn of spinning back is preferable from a viewpoint that the winding tension can be made small as pulling into winding shape so that the winding density can be made smaller.

In the roll-back, the original yarn of spinning is taken up by a winder as being unrolled. A general control method of the winder is to control the speed of the winder by a speed-regulating roller as detecting the tension or speed. However, the winding tension may become higher in the method of detecting the tension, and in the method of detecting speed, slight change of speed may increase the tension fluctuation as causing traverse failures and yarn breakage of liquid crystal polyester fibers whose elongation is small and whose elastic modulus is great. Therefore in the roll-back it is preferable that a winder which rotates at a controlled rotation speed directly takes up from a package of the original yarn of spinning, without intervention of the speed-regulating roller. In such a case, though the speed of the yarn sometimes gradually change as time passes by, the change in a short time is small, and the tension can be kept in a low level constantly, so as to obtain a package of which winding density is small and which has few winding collapses and few traverse failures.

The winding density, which can be made smaller as making the winding tension smaller, is preferably 1.0 cN/dtex or less, is more preferably 0.60 cN/dtex or less, and is further preferably 0.15 cN/dtex or less. The lower limit is 0.05 cN/dtex The take-up speed is preferably 800 m/min or less, more preferably 500 m/min or less, and particularly 400 m/min or less, in order to lower the winding density. On the other hand, higher take-up speed would be advantageous for productivity and is preferably 50 m/min or more, more preferably 100 m/min or more, particularly preferably 200 m/min or more. Besides, the take-up speed in this case is typified by the maximum speed though the speed sometimes fluctuates when rolled back over time in a method where a winder of which rotation speed is controlled takes up directly.

In the take-up, it is important to reduce the contact pressure (surface pressure) of a contact roll, etc., which is used to stabilize the tension by adjusting a package form. The contact pressure is preferably 400 gf or less, more preferably 300 gf or less, and is further preferably 200 gf or less. The contact pressure is preferably 50 gf or less, since the contact roll may be raised above the package as causing the traverse failure. In addition, the contact pressure also relates the contact length, which is also called winding stroke or traverse length. The longer the contact length is, the higher the contact pressure has to be. The longer the contact length, the more the winding amount of package becomes, and therefore the contact length is preferably 100 mm or more. On the other hand, the contact length is preferably 500 mm or less, since an excessively long contact length may increase the tension fluctuation at an end surface during unrolling after solid-phase polymerization.

In order to form a package, which may have few traverse failures even in a low-tension take-up, the winding formation, is preferably a taper-end winding provided with tapered both ends. In this case, the taper angle is preferably 75° or less, is more preferably 70° or less, and is further preferably 60° or less. Further, in a case where the taper angle is too small, because the fiber package cannot be made larger, the taper angle is preferably 15° or more, is more preferably 30° or more, and is further preferably 40° or more. Where, the taper angle referred to in the present invention is defined by the following equation.

$$\theta = \tan^{-1}\{2d/(li-lo)\}$$ [Equation 1]

θ: taper angle (°)
d: winding thickness (mm)
li: stroke of innermost layer (mm)
lo: stroke of outermost layer (mm)

The winding number is also important for suppressing the fusion-bonding. The winding number referred to herein means the number of times of rotation of a spindle during half reciprocation of a traverse. It is defined as a product of a time for the half reciprocation of a traverse (minute) and the rotational speed of a spindle (rpm). The higher winding number indicates the smaller traverse angle. Although a smaller winding number is advantageous for avoiding fusion-bonding because the contact area between fibers becomes smaller, under a condition of a low tension, low contact pressure, etc., which becomes a preferable take-up condition in the present invention, it is possible to decrease a traverse failure and to make a package form better as the winding number becomes higher. From these points, the winding number is preferably 2.0 or more and 20.0 or less, more preferably 3.0 or more and 15.0 or less, further preferably 5.0 or more and 10.0 or less.

In the present invention, the winding density of the package subjected to solid-phase polymerization is preferably 0.60 g/cc or less. The winding density referred to herein is a value calculated from Wf/Vf, where occupied volume Vf (cc) is obtained from an external dimension of package and a dimension of bobbin as a core member and Wf (g) is a fiber weight. In addition, the occupied volume Vf is a value which can be obtained by actually measuring the external dimension of package, or by calculating from a dimension measured on a photograph assuming the package is rotationally symmetric. Wf is a value which is calculated from the fineness and the take-up length, or which is actually measured by the weight difference between before and after take-up. Because the interfiber adhesion of package becomes enough weak to suppress fusion-bonding in a case where the winding density is smaller, the winding density is preferably 0.50 g/cc or less, more preferably less than 0.50 g/cc, and is further preferably 0.35 g/cc or less. In addition, because an excessively small winding density may cause a winding collapse or a traverse failure at end surfaces, it is preferably 0.01 g/cc or more, is more preferably 0.03 g/cc or more, is further preferably 0.05 g/cc or more, and is particularly preferably 0.20 g/cc or more.

The bobbin used for forming the fiber package may be any type bobbin as long as it has a cylindrical shape, and it is attached to a winder when rolled back, and the fibers are taken up to form a package by rotating it. In a solid-phase polymerization, although the fiber package can be treated integrally with the bobbin, the treatment can also be carried out at a condition where only the bobbin is taken out from the fiber package. In case where the treatment is carried out at a condition where the fibers are wound on the bobbin, it is necessary that the bobbin can resist the temperature of the solid-phase polymerization, and therefore, it is preferably made from a metal such as aluminum, brass, iron or stainless steel. Further, in this case, it is preferred that many holes are opened on the bobbin because a by-product of polymerization can be quickly removed and the solid-phase polymerization can be carried out efficiently. Further, in case where the treatment is carried out at a condition where the bobbin is taken out from the fiber package, it is preferred to attach an outer skin onto the outer layer of the bobbin. Further, in any of both cases, it is preferred that cushion material is wound around the outer layer of the bobbin, and that the liquid crystal polyester melt spun fibers are taken up onto it. In order to prevent fusion-bonding to liquid crystal polyester during solid-phase polymerization, the kind of the cushion material is preferably an organic fiber, such as a felt made of pararamid fiber or met-aramid organic fiber, and the thickness thereof is preferably 0.1 mm or more and 20 mm or less. The above-mentioned outer skin can also be formed by the cushion material.

The yarn length of the package subjected to the solid-phase polymerization is preferably 150,000 or more, more preferably 200,000 or more, from a viewpoint of enhancing productivity and continuity at a higher-order processing. The weight of the fibers is preferably 15 g or more, more preferably 100 g or more. The upper limits are 4,000,000 m and 20 kg, respectively.

It is also important, that an oil or a molding lubricant, which will be also just called oil hereinafter, is applied to the fiber surface, in order to prevent fusion-bonding at the time of the solid-phase polymerization. Although the application of such oil may be carried out between melt spinning and take-up, in order to increase the application efficiency, preferably it is carried out at roll-back of the original yarn of spinning, or a small amount of oil is provided at melt spinning and oil is further added at roll-back.

Although the method for oil adhesion may be a method for supplying oil by a guide, in order to apply oil to uniformly adhere to a fiber, such as monofilament, with a small total fineness, adhesion by a kiss roller (an oiling roller) made of a metal or a ceramic is preferred. The oil component high in thermal resistance is better because it is not vaporized at a high-temperature heat treatment in solid-phase polymerization, and as the oil component, a salt, an inorganic substance such as talc or smectite, a fluorine group compound, a siloxane group compound (dimethyl polysiloxane, diphenyl polysiloxane, methylphenyl polysiloxane, etc.), and a mixture thereof, are preferred. Among these, a siloxane group compound is particularly preferred because it exhibits an advantage for preventing fusion-bonding in solid-phase polymerization as well as an advantage for easy slipping property.

Although these components may be either provided at a solid substance adhesion condition or provided at a direct liquid application condition, in order to apply uniformly while correcting the amount of adhesion, an emulsion application is preferred, and water emulsion is particularly preferred from the viewpoint of safety. Therefore, the component is preferably water-soluble or easy to form water emulsion, and an oil mixture, whose main constituent is water emulsion of dimethyl polysiloxane and to which a salt or a water-swelling smectite is added, is most preferable.

The amount of oil adhered to the fibers is preferably 0.5 wt % or more, more preferably 1.0 wt % or more, further preferably 2.0 wt % or more, specifically preferably 4.0 wt % or more, because the fusion-bonding can be further suppressed as the amount of the oil increases. If it is too much, the fibers become sticky and they causes deterioration of handling. In addition it deteriorates a process passability in a post process, therefore the amount is preferably 10.0 wt % or less, more preferably 8.0 wt % or less, and particularly preferably 6.0 wt % or less. Where, the amount of oil adhered to the fibers indicates a value determined by the method in Example described later.

Although it is possible to perform solid-phase polymerization in an inert gas atmosphere, in an activated gas atmosphere containing oxygen such as air, or under a pressure reduced condition, it is preferably carried out in a nitrogen atmosphere from the viewpoint of simplifying the apparatus and preventing oxidation of fibers or adhered substances. In this case, the atmosphere for the solid-phase polymerization is preferably a low-humidity gas having a dew point of −40° C. or lower.

The maximum temperature of solid-phase polymerization temperature is preferably Tm1−60° C., where Tm1 (° C.) is defined as an endothermic peak temperature of the liquid crystal polyester fibers to be subjected to solid-phase polymerization. Such a high temperature around the melting point makes it possible for the solid-phase polymerization to progress immediately, so as to improve the fiber strength. Tm1 is generally a melting point of a liquid crystal polyester fiber, and it means a value obtained by a measurement method in Example described later in the present invention. The maximum temperature is preferably less than Tm1 (° C.) from a viewpoint of fusion-bonding prevention. It is preferable that the solid-phase polymerization temperature is enhanced gradually or continuously as time goes by, in order to prevent fusion-bonding and to improve the time efficiency of solid-phase polymerization. In this case, because the melting point of the liquid crystal polyester fibers increases together with progress of the solid-phase polymerization, the solid-phase polymerization temperature can be raised to around Tm1+100° C. of the liquid crystal polyester fibers before the solid-phase polymerization. However in this case, the maximum temperature during solid-phase polymerization is preferably Tm1−60 (° C.) or more and less than Tm1 (° C.), of the fibers which have been polymerized in solid phase, from a viewpoint of enhancing the solid-phase polymerization speed and fusion-bonding prevention.

The solid-phase polymerization time is preferably 5 hours or more and is more preferably 10 hours or more, in order to sufficiently enhance the molecular weight or strength, elastic modulus and elongation of the fiber. On the other hand, it is preferably 100 hours or less, and is more preferably 50 hours or less, in order to increase productivity, because effects of enhanced strength, elastic modulus and elongation are saturated over time.

Next, the fibers are unrolled from a package which has been polymerized in a solid phase. In order to suppress fibrillation at the time of delamination of a little fusion-bonding, it is preferred to unroll the yarn in a direction (fiber rounding direction) perpendicular to a rotation axis by so-called lateral unrolling, as rotating the package which has been polymerized in a solid phase. If the rotation of the solid-phase polymerized package is forced to be driven at a constant rotation speed by a motor, etc., there may be a trouble that the treatment cannot be achieved at a constant speed when the post-unrolling process is operated successively because the unrolling accompanies decreasing the winding diameter to decrease the speed gradually. So, the rotation of the solid-phase polymerized package may be performed by a positive driving, such as speed-regulating unrolling to control the rotation speed by a dancer roller, where the unrolling tension is directly or indirectly detected and is fed back into the rotation speed, however, the yarn which has been polymerized in solid phase and is inferior in abrasion resistance might cause fibrillation when passing through the dancer roller. Therefore it is preferable that the solid-phase polymerized package is subjected to a free roll and is unrolled as pulling the fibers by a speed-regulating roller, without the positive driving, because it makes it possible that the solid-phase polymerized yarn is unrolled as suppressing the fibrillation. The free roll consists of a shaft, bearings and an outer layer, and can suppress the fluctuation of the unrolling tension, because the braking function works by the sliding resistance of the bearings and the rotation speed slightly changes even kept almost constant.

Oil for fusion-bonding prevention, which adheres to the unrolled solid-phase polymerized yarn, is preferably removed. The oil effectively works for fusion-bonding prevention, however in a process after solid-phase polymerization or in a weaving process, excessive amount of oil may cause deterioration of process passability through deposition on guides, etc., and may generate a defect caused by deposited material mixing into products. Therefore the amount of oil is preferably reduced. In other words, the oil, which has adhered before solid-phase polymerization, can be removed after the solid-phase polymerization, so as to achieve fusion-bonding prevention, improvement of lengthwise fineness, strength and process passability.

The method for removing the oil may be achieved by wiping with a cloth or a paper while running the fibers continuously, for example, and is preferably a method for dipping the fibers in a liquid capable of dissolving or dispersing the oil, from the viewpoint of not giving a mechanical load to the solid-phase polymerized yarn in case of fibrillation. At that time, the fibers may be dipped in the liquid at a package condition from a viewpoint of increasing the throughput, and is preferably dipped in the liquid while being run continuously in order to achieve a removal which is uniform along a fiber lengthwise direction. The fibers may be dipped in the liquid, either by continuously blowing the liquid to the fibers or by being brought into contact with the liquid by a kiss roll, for example, and is preferably run in a bath filled with liquid, from a viewpoint of reducing the liquid usage, preventing the liquid flying around and contacting to the liquid for a long time. The fibers may be introduced into the bath by using a guide, etc., and it is preferable that slits are provided at both sides of the bath so that the fibers can pass through those slits in the bath, without providing any yarn path guide inside the bath, in order to suppress the fibrillation of the solid-phase polymerization derived from the contact resistance to the guide. At this time, it is possible that the fibers pass once in the bath, and it is preferable that the fibers pass several times in the bath by a free roller, turn roller and Nelson roller, etc., from a viewpoint of downsizing the bath size, reducing the liquid usage and extending the contact time. Further, in order to enhance the speed of dissolution or dispersion of a fusion inhibitor, it is specifically preferable to add surfactant into the liquid, to give air bubbles or ultrasonic vibration, to give liquid flow, to give vibration to fibers dipped into the liquid and to contact between fibers and the other material in the liquid. Among them, it is preferable to give liquid flow from a viewpoint of simplifying the facility and saving energy. As a method of giving the liquid flow, exemplified can be agitating inside the liquid bath or giving the liquid flow by nozzles, and it is preferable to give the liquid flow by nozzles from a viewpoint that the nozzles can supply the liquid as circulating in the liquid bath.

It is also preferably that liquid is served to the package before removing the fusion inhibitor as running. Such a method, where the liquid is poured onto the package or the package is dipped into a liquid bath, is preferable for improving removal efficiency of fusion inhibitor. Further, a method where the package is ultrasonically cleaned as dipped into the liquid bath is more preferable for further improving removal efficiency of fusion inhibitor.

The liquid used for the removal may be water and various organic solvents, such as chloroform, carbon tetrachloride, 1,2-dichloroethane, 1,2-dichloroethylene, 1,1,2,2-tetrachloroethane, trichloroethylene, carbon disulfide, acetone, isobutyl alcohol, isopropyl alcohol, isopentyl alcohol, ethyl ether, ethylene glycol monoethyl ether, ethylene glycol monoethyl ether acetate, ethylene glycol monobutyl ether, ethylene glycol monomethyl ether, ortho-dichlorobenzene, xylene (ortho), xylene (meta), xylene (para), cresol (ortho), cresol (meta), cresol (para), chlor benzene, isobutyl acetate, isopropyl acetate, isopentyl acetate, ethyl acetate, butyl acetate, propyl acetate, pentyl acetate, methyl acetate, cyclohexanol, cyclohexanone, 1,4-dioxane, dichloromethane, N,N-dimethylformamide, styrene, tetrachloroethylene, tetrahydrofuran, 1,1,1-trichloroethane, toluene, n-hexane, 1-butanol, 2-butanol, propanol, ethanol, methanol, methyl isobutyl ketone, methyl ethyl ketone, methylcyclohexanol, methyl cyclohexanone, methyl butyl ketone, industrial gasoline 1-5, coal tar naphtha (solvent naphtha) 1-3, petroleum ether, petroleum naphtha (light, heavy), oil benzine (reagent), turpentine, mineral spirits, and these mixtures. It is preferably water, in order to get rid of ignition possibility, and to reduce environment load.

The higher the temperature of the liquid is, the higher the efficiency of the removal is, and it is preferably the boiling point of the liquid–80° C. or higher, more preferably the boiling point of the liquid–60° C. or higher, further preferably the boiling point of the liquid–40° C. or higher. However, if the temperature is too high, because evaporation of the liquid becomes remarkable, it is preferably the boiling point of the liquid–10° C. or lower, more preferably the boiling point–20° C. or lower, further preferably the boiling point of the liquid–30° C. or lower. In a case of water, it is preferably 30° C. or higher, and is more preferably 40° C. or higher.

The liquid used for the removal can be a surfactant suitable for the fusion inhibitor, where the surfactant may be an anionic surfactant such as fatty acid salt, alpha sulfofatty acid ester salt, alkyl benzene sulfonate, linear alkyl benzene sulfonate, alkyl sulfate, alkyl ether sulfuric acid ester salt, alkylsulfuric acid triethanolamine and alkylphosphonate ester, or a nonionic surfactant such as fatty acid diethanolamide, polyoxyethylene alkyl ether, polyoxyethylene alkyl ester, polyoxyethylene alkylamine, polyoxyethylene alkyl phenyl ether and sorbitan alkyl ester, or a cationic surfactant such as higher amine haloid acid salt, alkyl trimethyl ammonium salt, dialkyl dimethyl ammonium chloride and alkyl pyridinium chloride, or alkyl carboxy betaine as a zwitterionic surfactant, and may be these mixtures. The surfactant amount added is preferably 0.01-1 wt %, and more preferably 0.1-0.5 wt %, from a viewpoint of higher removal efficiency and lower environmental load.

The longer the contact time with the liquid is, the higher the removal efficiency can be enhanced, therefore it is preferably 0.01 seconds or more, more preferably 0.1 seconds or more, and further preferably 0.5 seconds or more. The upper limit is 30 seconds.

The contact length with the liquid, though it depends on speed, is preferably 30 cm and more, more preferably 50 cm or more, further preferably 1 m or more so as to be able to ensure the above-described treatment time. The upper limit is 20 m.

A preferable constituent is the same as the constituent of the above-described fusion inhibitor applied before the solid-phase polymerization. The most preferable embodiment is a mixture, where water-soluble salt or water-swellable smectite is added to a main constituent of dimethylpolysiloxane. The liquid used for the removal is preferably water, and it is surprising that dimethylpolysiloxane, regardless of its essential lipophilicity, well disperses in water during the removal after the solid-phase polymerization. Though the reason is not sure, it is speculated that dimethylpolysiloxane which has been heated at high temperature for a long time during solid-phase polymerization decomposes into small molecules, so as to improve the dispersibility.

Although the degree of the oil removal is appropriately adjusted depending upon the purpose, it is preferable that the oil adhesion amount is 0.05 to 2.0 wt % from a viewpoint of leaving a little oil for improving the process passability of the fibers in a higher-order processing process or a weaving process, in order to simplify the process. Specifically, in order to prevent defects derived from oil deposit mixing into products, the oil adhesion amount is preferably reduced, and is more preferably 1.0 wt % or less, further preferably 0.9 wt % or less. Besides, the oil adhesion amount means a value determined by the method in Example described later.

Next, the solid-phase polymerized yarn is subjected to high-temperature heat treatment in order to obtain liquid crystal polyester fibers having a peak half-width of 15° C. or greater at Tm1, according to the present invention. In addition, the solid-phase polymerized package is unrolled and separated from oil, and then subjected to high-temperature heat treatment without being once taken up, in order to obtain the liquid crystal polyester fibers having U % H less than 10%, according to the present invention. This is a key technological point to obtain liquid crystal polyester fibers according to the present invention, as explained in the section of Background Art of the Invention. In order to unroll the solid-phase polymerized package and remove oil therefrom, and then subject it to high-temperature heat treatment without being once taken up, there may be a method, where the oil-removed fibers are once put in a can, and then the fibers are taken out to be subjected to high-temperature heat treatment. In order to enhance the treatment tension stability and the uniformity of fiber diameter along lengthwise direction, it is preferable that the high-temperature heat treatment is successively performed after unrolling and oil removal because the tension fluctuates greatly when it is taken off.

It is necessary to keep unrolling speed constant for performing the high-temperature heat treatment successively after the unrolling and oil removal. Therefore it is important that the solid-phase polymerized package has few traverse failures without winding collapse. That can be effectively achieved by increasing the winding density and taking up as giving surface pressure. However in such a case, because adhesion increases between fibers, they tend to be fusion bonded as causing a problem, such as deterioration of uniformity in fiber lengthwise direction. The prior arts have achieved this by decreasing the winding tension without giving surface pressure, because they emphasize the winding density should be maximally decreased for preventing fusion-bonding. In such a case, the taper angle is kept small and the winding figure as a whole is formed as intentionally collapsed with the end surface by periodically shaking the traverse. However when unrolled at constant speed, the rotation speed of bobbin has to be made different between the tapered portion and the center because diameter changes in the tapered portion when the end surface collapses so that fibers are layered and taken up on the tapered portion of the package. Such a control of rotation speed is not possible for solid-phase polymerized liquid crystal polyester fibers, of which elongation is smaller and of which abrasion resistance is more inferior, and therefore in prior arts, the solid-phase polymerized package has been actively driven to be unrolled at an almost constant tension where the speed is not constant.

In contrast, in order to achieve liquid crystal polyester fibers according to the present invention, surface pressure is given at a low level in the roll-back before solid-phase polymerization without shaking the traverse, as forming a package having low winding density and few traverse failure.

Therefore, the unrolling can be performed at a constant speed, and the successive treatment, unrolling-oil removal-high temperature heat treatment, can be achieved. At that time, because the winding density is relatively low but higher than that in the prior art, the fusion-bonding, which is easily caused, can be suppressed by increasing oil adhesion amount for solid-phase polymerization. Further, oil is removed after solid-phase polymerized yarn is unrolled, so that the adhesion amount to fibers can be reduced finally.

In the liquid crystal polyester fibers according to the present invention, reduction of oil adhesion is significant particularly for preventing from defects caused by mixing oil deposits into products. In prior arts, though there has been a process where solid-phase polymerized fibers are unrolled in a packaged form and are once taken up, large amount of oil has to be applied for taking up into a package because a solid-phase polymerized yarn having less amount of oil adhesion cannot achieve sufficient abrasion resistance. In contrast, in order to achieve liquid crystal polyester fibers according to the present invention, a solid-phase polymerized yarn is subjected to high-temperature heat treatment without being taken up after oil removal. Therefore, the yarn path, where the solid-phase polymerized yarn runs in a condition of low oil adhesion, is enough short to suppress fibrillation. Therefore, the amount of oil subjected to the heat treatment can be reduced maximally, and the amount of oil in final products can be also reduced. In addition, the oil amount in fibers served to the heat treatment is defined as a value determined by the method in Example described later.

A temperature of the heat treatment for the solid-phase polymerized fibers is preferably controlled at a temperature of Tm1+60° C. or higher. Tm1 means a value determined by the method in Example described later. Tm1 is a melting point of the fiber, and when liquid crystal polyester fibers are subjected to heat treatment at a high temperature of the melting point+10° C. or higher, the peak-half width of Tm1 becomes higher than 15° C., as greatly improving the abrasion resistance. The effect becomes remarkable when the single-fiber fineness is small.

As for a rigid molecular chain like liquid crystal polyester, relaxation time is long, and inner layer also relaxes within the time for surface layer to relax, as melting the fiber. Studying technologies suitable for liquid crystal polyester fibers to improve abrasion resistance found out that abrasion resistance of liquid crystal polyester fibers can be improved by heating to reduce crystallinity and crystal perfection as a whole fiber without relaxation of molecular chain.

Further, in order to reduce crystallinity, fibers have to be heated above the melting point. As to a thermoplastic synthetic fiber, such a high temperature may reduce strength and elastic modulus particularly in case of small single-fiber fineness, as further causing thermal transformation and fusion (meltdown). Such a behavior was seen with liquid crystal polyester, however, the present inventors found out that increase of molecular weight makes relaxation time very long and the molecular mobility is low as for solid-phase polymerized liquid crystal polyester fibers. Therefore, even if it is heat treated at a high temperature above the melting point for a short time, the crystallinity can be reduced as keeping the orientation of molecular chains at a high level, and the strength and the elastic modulus are not greatly deteriorated. From these facts, it was found that liquid crystal polyester fibers, particularly as to liquid crystal polyester fibers with small single-yarn fineness, can be improved in abrasion resistance by high-temperature heat treatment above Tm1+10° C. for a short time, without great loss of strength, elastic modulus and thermal resistance of the liquid crystal polyester fibers.

The high-temperature heat treatment temperature is more preferably set to not less than Tm1+40° C. of the solid-phase polymerized fibers in order to lower the crystallinity of fibers and to lower the crystal perfection, and is further preferably not less than Tm1+60° C. of the solid-phase polymerized fibers, and is particularly preferably not less than Tm1+80° C. The upper limit of the treatment temperature, at which the fibers melt down, is Tm1+300° C., though depending on tension, speed, single-fiber fineness, treatment length.

Where, although there is a case for carrying out a heat treatment for a liquid crystal polyester fibers even in a conventional technology, it is generally carried out at a temperature lower than a melting point because the liquid crystal polyester is thermally deformed (fluidized) by stress even at a temperature lower than the melting point. As the point of heat treatment, although there is a solid-phase polymerization of a liquid crystal polyester fiber, even in this case, if the treatment temperature is not set at a temperature lower than the melting point of the fiber, the fibers are fused and broken by being molten. In case of solid-phase polymerization, although a final temperature of the solid-phase polymerization may elevates up to a temperature higher than the melting point of the fibers before the treatment because the melting point of the fibers elevates accompanying with the treatment, even in such a case, the treatment temperature is lower than the melting point of the fibers being treated, that is, the melting point of the fibers after the heat treatment.

The high-temperature heat treatment in the present invention increases the abrasion resistance by decreasing a structural difference between a dense crystal portion formed by a solid-phase polymerization and an amorphous portion, namely by decreasing the degree of crystallization and crystal perfection, without carrying out a solid-phase polymerization. Therefore, even if Tm1 varies by the heat treatment, the temperature of the heat treatment is set preferably at a temperature of Tm1 of the fibers after being varied+10° C. or higher, more preferably at a temperature of the Tm1+40° C. or higher, further preferably at a temperature of the Tm1+60° C. or higher, and particularly preferably at a temperature of the Tm1+80° C. or higher. The more the heat treatment temperature is, the more thermal efficiency is enhanced to shorten the heater length, and that is preferable because the production cost can be kept lower. On the other hand, if the heat treatment temperature is higher there might be oxidative decomposition of fiber surface, and if it is too high there might be heater pollution or yarn breakage. In addition, because much energy is required in order to maintain the temperature at a high level, the upper limit is preferably set to 600° C., so as to improve the productivity even from a viewpoint of energy saving. From viewpoints thereof, the temperature range for the heat treatment is preferably Tm1+70° C. or more, and 600° C. or less. It is more preferably Tm1+80° C. or more, and 570° C. or less, and is most preferably Tm1+100° C. or more, and 550° C. or less.

Further, as another heat treatment, there is a heat stretching of a liquid crystal polyester fiber, but the heat stretching is a process tensing the fibers at a high temperature, the orientation of molecular chain in the fiber structure becomes high, the strength and the elastic modulus increase, and the degree of crystallization and the completion of crystallinity are maintained as they are, namely, ΔHm1 is maintained to be high and the half width of the peak Tm1 is maintained to be small. Therefore, it becomes a fiber structure being inferior in abrasion resistance, and the treatment is different from the heat treatment in the present invention that aims to increase the abrasion resistance by decreasing the degree of crystallization (decreasing $\Delta Hm1$) and decreasing the completion of crystallinity (increasing the half width of the peak). Besides, because the degree of crystallization decreases in the heat treatment referred to by the present invention, the strength and the elastic modulus do not increase.

It is preferable that the high-temperature heat treatment is performed as running the fibers continuously, because the fusion-bonding between fibers can be prevented, so as to enhance the uniformity of the treatment. At that time, it is preferable that a non-contact heat treatment is performed, so as to prevent generating the fibrils as achieving uniform treatment. The heating may be a heating of the atmosphere or a radiation heating with a laser or an infrared ray, etc., and is preferably a heating by a slit heater with a block or a plate heater because it has both advantages of atmosphere heating and radiation heating and it can enhance the stability for the treatment.

The treatment time is preferably longer from a viewpoint of decreasing the crystallinity and the crystal perfection, and is specifically preferably 0.01 second or longer, more preferably 0.05 second or longer, further preferably 0.1 second or longer. The upper limit of the treatment time is preferably 5.0 seconds, more preferably 3.0 seconds, further preferably 2.0 seconds, from a viewpoint that the facility load should be reduced and that the treatment time should be shortened so that the orientation of the molecular chain is prevented from relaxing to decrease the strength and the elastic modulus.

If the tension of the fibers being treated is excessively high, a melt breakage is likely to occur, and in case where the heat treatment is carried out at a condition applied with an excessive tension, because the decrease of the degree of crystallization is small and the advantage for improving the abrasion resistance becomes low, it is preferred to control the tension as low as possible. In this point, it is explicitly different from a heat stretching. However, if the tension is too low, the running of the fibers becomes unstable and the treatment becomes nonuniform, and therefore, it is preferably 0.001 cN/dtex or more and 1.0 cN/dtex or less, more preferably 0.1 cN/dtex or more and 0.3 cN/dtex or less.

When high-temperature heat treatment is performed during running, the tension is preferably lower, and stretching and relaxation may be appropriately added. However, if the tension is too low, the running of the fibers becomes unstable and the treatment becomes nonuniform, and therefore, the relaxation rate is preferably 2% or less (0.98 times or higher as a stretching ratio). Further, if the tension is too high, a melt breakage due to heat is likely to occur, and in case where the heat treatment is carried out at a condition applied with an excessive tension, because the decrease of the degree of crystallization is small and the advantage for improving the abrasion resistance becomes low, the stretching rate is preferably less than 10% (1.10 times as a stretching ratio), although it depends upon the temperature of the heat treatment. It is more preferably less than 5% (1.05 times as a stretching ratio), further preferably less than 3% (1.03 times as a stretching ratio). The stretching ratio is defined as a quotient of the second roller speed to the first roller speed when the heat treatment is performed between the rollers (between the first roller and the second roller).

As the treatment speed becomes greater, a high-temperature short-time treatment becomes possible and the advantage for improving the abrasion resistance increases, though depending upon the treatment length, and even the productivity improves, and therefore, it is preferably 100 m/min or more, more preferably 200 m/min or more, further preferably 300 m/min or more. The upper limit of the treatment speed is about 1000 m/min from a viewpoint of running stability of the fiber.

With respect to the treatment length, though depending upon the heating method, in case of non-contact heating, in order to carry out a uniform treatment, it is preferably 100 mm or more, more preferably 200 mm or more, further preferably 500 mm or more. Further, if the treatment length is excessively great, because a treatment irregularity and melt breakage of fibers occur ascribed to yarn swinging in the heater, it is preferably 3,000 mm or less, more preferably 2,000 mm or less, and further preferably 1,000 mm or less.

Though the adhesion amount of oil for the solid-phase polymerization of fibers to be subjected to high-temperature heat treatment is preferably low, it is preferable that a process oil for improving smoothing is added in order to improve process passability in the following processes, and weavability of a weaving machine, as for fibers to become products after high-temperature heat treatment. The oil constituent may be a conventional one, such as block of alkylene oxide of monohydric or polyhydric alcohol with carbon number 1-20, polyether compound as random addition copolymer or such a polyether compound of which end hydroxyl group is blocked with alkyl group or with fatty acids, etc., monohydric alcohol such as oleyl laurate and oleyl oleate, monohydric alcohol such as ester of monohydric basic aliphatic carboxylic acid, dioctyl sebacate and dioleyl adipate, monohydric alcohol such as ester of polyhydric basic aliphatic carboxylic acid, dilaurylphthalate and trioleyl trimellitate, polyol such as ester of aromatic carboxylic acid, ethylene glycol dioleate, trimethylol propane tricaprylate, glycerin trioleate and bisphenol dioleate, ester of monohydric basic aliphatic carboxylic acid or its derivative of alkylene oxide addition ester such as lauryl (EO) n octanoate, and paraffinum liquidum, such as paraffin group, of which viscosity measured at 30° C. is 30 seconds as Redwood second, as including mixture of them. Above all, water emulsion, comprising a smoothing agent whose main constituent is polyether compound and an emulsifier whose main constituent is lauryl alcohol, can be exemplified as a suitable embodiment.

As for taking fibers up after the high-temperature heat treatment, conventional winders which take up as controlling tension and speed, etc., are applicable. The yarn length of liquid liquid crystal polyester fibers according to the present invention is preferably 150,000 m or more. Because the yarn length is long it is preferably formed into a package. Because the end surface tends to collapse in case of monofilaments, its package form is preferably a form where an end surface is tapered, and is more preferably a form of a taper-end-cheese winding or pirn winding. Because an end surface collapses if the taper angle at the end surface is excessively great, it is preferably 70° C. or less, more preferably 60° C. or less. Because the winding amount cannot be increased if the taper angle is smaller, it is preferably 30° C. or more, and is more preferably 40° C. or more.

Hereinafter, structural change of fibers during high-temperature heat treatment will be described from a viewpoint of characteristic difference of fibers before and after treatment. The heat treatment means a short-time heat treatment at a high temperature no less than the melting point of the fiber, where the crystallinity decreases but the orientation does not relax. Such a fact is shown in a structural change, such that $\Delta Hm1$ decreases, that half-width at $Tm1$ increases, and that $2\Delta\theta$ increases, but that $\Delta n$ does not change almost at all by the heat treatment. In addition, the molecular weight does not change because the treatment time is short. Reducing crystallinity generally causes great reduction of mechanical characteristics. Even in the heat treatment of the present invention, strength and elastic modulus are lowered without increasing, however in the present invention, the strength and elastic modulus are kept at a high level as maintaining the high melting point (Tm1) and abrasion resistance, in order to maintain the high molecular weight and orientation. In addition, the compression coefficient of elasticity decreases by heat-treatment. As to the abrasion resistance improvement, it becomes a factor that a whole fiber becomes flexible by the crystallinity reduction as decreasing a differential structure between crystal/amorphous as an origination of collapses, and in addition, the load distribution effect caused by reduction of compression elastic modulus further enhances the abrasion resistance.

The liquid crystal polyester fibers according to the present invention are improved in abrasion resistance while the features of high strength, high elastic modulus and high thermal resistance can be kept, and it can be used broadly in uses such as materials for general industry, materials for civil engineering and construction, materials for sports, clothing for protection, materials for reinforcement of rubbers, electric materials (in particular, as tension members), acoustic materials, general clothing, etc. As effective uses, can be exemplified screen gauzes, filters, ropes, nets, fishing nets, computer ribbons, base fabrics for printed boards, canvases for paper machines, air bags, air ships, base fabrics for domes, etc., rider suits, fishlines, various lines (lines for yachts, paragliders, balloons, kite yarns, etc.), blind cords, support cords for screens, various cords in automobiles or air planes, power transmission cords for electric equipment or robots, etc., and as a particularly effective use, woven fabrics for industrial materials comprising monofilaments, in particular, monofilaments for printing screen gauzes are suitable, for the monofilaments strongly require high strength, high elastic modulus and higher fineness, and also require abrasion resistance for improving weavability and fabric quality.

Hereinafter a method for producing the liquid crystal polyester fibers according to the present invention will be explained.

In a method for producing the liquid crystal polyester fibers according to the present invention, the melting point of the liquid crystal polyester, the molten viscosity, the molecular weight measured before melt spinning, applicable additives, melt spinning method, etc., are the same as described above in production examples of liquid crystal polyester fibers according to the present invention.

In the method for producing according to the present invention, liquid crystal polyester fibers which have been melt spun are formed into a package and are polymerized in solid-phase, so as to simplify facilities and improve productivity. The form of the package may be pirn, cheese, corn or bobbin with a brim. The package form such as pirn and bobbin with the brim where surfaces do not contact to rollers when taken up, is preferable in order not to damage fibers when the package is formed.

In conditions where the package is formed by rolling the melt spun liquid crystal polyester fibers back, winding tension, winding density, taper angle, winding number, bobbin form, bobbin material, package weight, contact pressure and contact length, etc., are the same as described above in the production example of liquid crystal polyester fibers according to the present invention.

In these conditions, contact pressure in the roll-back has a significantly important meaning. In the producing method according to the present invention, in order to perform the heat treatment between rollers which are regulated in speed, as unrolling the liquid crystal polyester fibers from the solid-phase polymerized package, without being once taken up, it is necessary to keep unrolling speed and tension constant. Conventionally, the package to be subjected to the solid-phase polymerization reduces fusion-bonding by keeping zero contact pressure, which means that the contact roll is in a non-contact condition. However in such a case, the package form is so unstable that winding collapses or traverse failures may occur, and therefore it is difficult to keep unrolling speed and tension constant. In the present invention, the roll-back condition, contact pressure in particular, is adjusted to improve package forms and to reduce fusion-bonding, so that unrolling process from the package after solid-phase polymerization and heat treatment process between rollers controlled in speed, can be performed successively.

In the producing method of the present invention, it is preferable that a fusion inhibitor is applied to liquid crystal polyester fibers to be formed into a package before solid-phase polymerization, in order to prevent fusion-bonding during solid-phase polymerization. Though such applying these constituents may be performed from melt spinning process to take-up process, it is preferably performed when rolled back, or it is preferable that small amount of it is applied during melt spinning, and is additionally applied during roll-back.

As to the fusion inhibitor, conditions such as, application method, constituent and applied amount, etc., are the same as described above in the production example of liquid crystal polyester fibers according to the present invention.

When the solid-phase polymerization is performed, it is also significant that the above-described package forming method is combined with applying a fusion inhibitor so as to prevent from fusion-bonding, which is remarkable, in case of single-fiber fineness of 18 dtex or less, and particularly of 10 dtex or less.

As to the solid-phase polymerization conditions, atmosphere, solid-phase polymerization temperature, maximum temperature and treatment time, etc., are the same as described above in the production example of liquid crystal polyester fibers according to the present invention.

Next in the producing method of the present invention, the liquid crystal polyester fibers which have been solid-phase polymerized in a packaged form are unrolled and successively heat treated without being once taken up. Because they are heat treated as they are not once taken up, winding facility cost and labor cost for driving workers can be suppressed from rising. In addition, defects such as fibrils can be prevented from generating as reducing opportunities that the liquid crystal polyester fibers, which are inferior in abrasion resistance before heat treatment, may come into contact with guide groups, such as traverse guides, which relate with take-up.

In the producing method of the present invention, it is preferable that the fusion inhibitor, which has been applied before the solid-phase polymerization, is removed before heat treatment, as unrolling the liquid crystal polyester fibers which have been polymerized in solid-phase. The removal, referred to in the present invention, means that the adhesion amount of fusion inhibitor to fibers is reduced. The more the fusion inhibitor is applied, the higher the effect of fusion-bonding prevention is in a solid-phase polymerization. However, excessively much amount of fusion inhibitor may cause deterioration of process passability derived from depositions on guides and reeds, as generating defects by mixing deposits into products, in processes following the solid-phase polymerization and a weaving process. Therefore, the adhesion amount of fusion inhibitor is preferably lowered to minimum required. If the fusion inhibitor, which has been applied before solid-phase polymerization, is removed after the solid-phase polymerization, fusion-bonding prevention, process passability improvement and product defects reduction can be achieved.

The removal is preferably performed before heat treatment process, specifically before the first roller in the heat treatment. Because heat treatment temperature is further higher than solid-phase polymerization temperature, denaturation or sublimation decomposition of the fusion inhibitor may occur when the fibers applied with fusion inhibitor pass the heat treatment process. When a sublimation product deposits in a heater it may come into contact with fibers as fluctuating the running tension causing fineness fluctuation, and the sublimation product may mix in the fibers to generate a defect. Further, it is difficult to remove denatured fusion inhibitors. Furthermore, the solid-phase polymerized yarn becomes further inferior in abrasion resistance after removing the fusion inhibitor. However, if the removal is performed before the first roller and the heat treatment is performed immediately, the distance, where the solid-phase polymerized yarn runs after removal of the fusion inhibitor, can be set short, so as to prevent fibrillation.

As for fusion inhibitor removal, removing method, liquid used for removal, surfactant, liquid temperature, contact time and contact length, etc., are the same as described above in the production example of liquid crystal polyester fibers according to the present invention. The removal rate of fusion inhibitor in a removal process is preferably 10% or more, more preferably 20% or more, further preferably 30% or more, from a viewpoint of improving process passability in higher-order processing.

The heat treatment temperature is set to an endothermic peak (Tm1)+60° C., where the endothermic peak is observed by differential calorimetry of the liquid crystal polyester fibers after the solid-phase polymerization, under a temperature elevation of 20° C./minute from 50° C. Tm1 is a melting point of the fiber, and if the liquid crystal polyester fibers are heat treated at a high temperature of 60° C. or higher, abrasion resistance greatly improves, particularly in a case where single-fiber fineness is small and specifically 18 dtex or less.

As to a heat treatment process, heat treatment temperature range, heating means, treatment time, running tension, treatment speed and treatment length, etc., are the same as described above in the production example of liquid crystal polyester fibers according to the present invention.

In the producing method of the present invention, it is significant that speeds of the fibers before and after heat treatment are regulated, respectively, by a first roller and a second roller. Because the heat treatment is performed at a temperature of the melting point of the fibers or higher, in the present invention, treatment tension becomes extremely low. Therefore, it becomes extremely important that speeds of the fibers before and after heat treatment are regulated in order to minimize fluctuation of heat treatment tension. As for fluctuation factor before heat treatment process, there exist several factors, such as one derived from a winding form or light fusion-bonding when the fibers are unrolled from the solid-phase polymerized package, tension fluctuation by a removal means as passing through the process for removing fusion inhibitor, and tension fluctuation by scratch resistance at a yarn path guide. On the other hand, as for fluctuation factor after heat treatment process, there exist take-up tension fluctuation for finally taking the fiber up, resistance which is generated when completion oil is given, and scratch resistance at a yarn path guide. Because elastic modulus of liquid crystal polyester fibers is greatly higher than those of general synthetic fibers even before and after heat treatment, unexpected high tension fluctuation may occur only by twilling operation when unrolled from a simple package or taken up into a package. Therefore, the speed regulation is extremely significant in the present invention.

The speed regulation may be performed so that the fiber speed and each roller speed are the same without sliding at each roller, and is preferably a conventional speed regulation method, such as nip roller method where a fiber, which is inserted between a motor-driven roller and a freely-rotatable roller of which surface contacting to the other roller is covered with material, such as hard rubber, softer than metals, belt nip method where a belt pushes the fibers onto the roller instead of the freely-rotatable roller in the nip roller method, and apron belt method, as including Nelson method, where a freely-rotatable metal roller, which has small diameter and typically has pearskin surface, is provided as being slightly inclined from a rotation axis of a motor-driven roller to a fiber running direction, and the pair of rollers are wound by several rounds with fibers as making each yarn path slightly different from another, so that the speed is regulated by a broader area to contact to the driven roller. In Nelson method, the more the number of rounds is the broader the area to contact to the driven roller so as to reduce slipping probability. Therefore, the number of turns is preferably 4 rounds or more, and is more preferably 6 rounds or more. From a viewpoint of speed regulation, the limit is practically 10 rounds, for the more number of rounds requires the longer length along the roller axis direction. Process oil giving after heat treatment, adhesion amount and taking final products up, etc., are the same as described above in the production example of liquid crystal polyester fibers according to the present invention. In addition, characteristics of obtained fibers are the same as liquid crystal polyester fibers according to the present invention.

EXAMPLES

Hereinafter, the present invention will be explained in detail based on Examples although the present invention is not limited thereto at all.

Where, determinations of the respective properties in the present invention have been carried out by the following methods.

(1) Weight Average Molecular Weight Converted from Polystyrene (Molecular Weight):

Using a mixed solvent of pentafluoro phenol/chloroform=35/65 (weight ratio) as the solvent, a sample for GPC measurement was prepared by dissolution so that the concentration of liquid crystal polyester became 0.04 to 0.08 weight/volume %. Where, in case where there is an insoluble substance even after left at a room temperature for 24 hours, the sample was left further for 24 hours, and then, a supernatant was taken as the sample. This was measured using a GPC measurement apparatus produced by Waters Corporation, and the weight average molecular weight (Mw) was determined through a polystyrene-equivalent weight average molecular weight.

Column: Shodex K-806M; two pieces, K-802; one piece
Detector: Differential refractive index detector RI (2414 type)
Temperature: 23±2° C.
Flow rate: 0.8 mL/min
Injection amount: 200 μL (2) Tm1 of Liquid Crystal Polyester Fiber, Half Width of Peak at Tm1, ΔHm1, Tc, ΔHc, Tm2, ΔHm2, Reduction Rate of Heat of Melting, Lowering Rate of Heat of Melting Melting Point of Liquid Crystal Polyester Polymer:

Differential calorimetry was carried out by DSC 2920 produced by TA Instruments Corporation, a temperature of endothermic peak observed when measured under a condition of heating from 50° C. at a temperature elevation rate of 20° C./min was referred to as Tm1 (° C.), and the half width of the peak (° C.) and the heat of melting (ΔHm1) (J/g) at Tm1 were measured. In this measurement presence or absence of exothermic peak was determined, and in a case where the peak is observed, the exothermic heat was measured. Successively, a temperature of an exothermic peak, observed when cooled down under a condition of a temperature lowering rate of 20° C./min after maintained for five minutes at a temperature of Tm1+20° C. after observation of Tm1, was referred to as Tc (° C.), and a heat of crystallization (ΔHc) (J/g) at Tc was measured. Successively, cooling was carried out down to 50° C., and an endothermic peak observed when heated again under a condition of a temperature elevation rate of 20° C./min was referred to as Tm2, and a heat of melting (ΔHm2) (J/g) at Tm2 was measured. Where, as to the liquid crystal polyester polymer shown in Reference Examples, an endothermic peak observed when once cooled down to 50° C. under a condition of a temperature lowering rate of 20° C./min after maintained for five minutes at a temperature of Tm1+20° C. after observation of Tm1 was referred to as Tm2, and this Tm2 was referred to as the melting point of the polymer.

(3) Variable Waveform of Half Inert Diagram Mass Waveform (U % H) in Uster Yarn Irregularity Tester:

The half inert diagram mass waveform is determined by a yarn irregularity tester UT-4 (manufactured by Zellweger Uster Corp.) for 5 minutes at 200 m/min, without using a twister. Each of a fiber package is measured 3 times within 10,000 m from the outermost layer, and is measured 3 times within 10,000 m from the innermost layer, and six waveforms in total are obtained per one fiber package. The variable peak, of which absolute value is the greatest in each waveform, is read out from a chart, and the maximum absolute value among the six waveforms is defined as U % H variable waveform (%) of the sample.

(4) Value of Variable at Outer Diameter Measurement:

The measurement is performed for 3 minutes at 400 m/min in condition of sampling rate 0.002 seconds, as using external form measurer D-6101ROSSDORF1 manufactured by Zimmer corp. Each of a fiber package is measured 3 times within 10,000 m from the outermost layer, and is measured 3 times within 10,000 m from the innermost layer, and six outer diameters in total are measured per one fiber package. From one data group of results of outer diameter measurement, the deviation, which means a difference from the average of a whole data, is calculated, and the value of variable (%) is calculated from the maximum absolute value and the average by the following equation. Among six results of outer diameter measurement, the maximum absolute value is defined as value of variable (%) of the sample at outer diameter measurement.

$$(\text{Deviation at maximum absolute value}) \times 100 / \text{average} = \text{value of variable (\%)}$$

(5) Single-Fiber Fineness and Fluctuation Rate of Fineness:

The fibers were taken by 10 m using a hank by a sizing reel, the weight (g) thereof was multiplied at 1,000 times, 10 measurements per 1 sample were carried out, and the average value was defined as a fiber fineness (dtex). A quotient calculated by dividing this with the number of filaments was defined as single-fiber fineness (dtex). A fluctuation rate of fineness was calculated by the following equation using a greater value among absolute values of a difference between the average value of the 10 times measurement of the fineness and the maximum value or the minimum value.

$$\text{Fluctuation rate of fineness (\%)} = \{(|\text{maximum or minimum value} - \text{average value}|/\text{average value}) \times 100$$

(6) Strength, Elongation, Elastic Modulus and Fluctuation Rate of Tenacity:

Based on the method described in JIS L1013: 1999, at a condition of a sample length of 100 mm and a tensile speed of 50 mm/min, 10 times measurement per one sample was carried out using Tensilon UCT-100 produced by Orientech Corporation, and the average values were determined as a strength (cN), an elongation (%) and elastic modulus (cN/dtex). A fluctuation rate of tenacity was calculated by the following equation using a greater value among absolute values of a difference between the average value of the 10 times measurement of the fineness and the maximum value or the minimum value.

$$\text{Fluctuation rate of tenacity (\%)} = \{(|\text{maximum or minimum value} - \text{average value}|/\text{average value}) \times 100$$

(7) Compression Elastic Modulus in a Direction Perpendicular to Fiber Axis (Compression Elastic Modulus):

One single-fiber was placed on a stage high in rigidity such as ceramic stage, at a state where a side of an indenter was set in parallel to the fiber, a compression load was applied at a constant test speed using the indenter in the diameter direction under the following condition, and after a load-displacement curve was obtained, a compression elastic modulus in a direction perpendicular to fiber axis was calculated from the following equation. In the measurement, in order to amend an amount of deformation in a device system, a load-displacement curve was obtained at a state where the sample was not placed, by closely resembling this with a straight line the amount of deformation in the device relative to a load was calculated, and then, the sample was placed, a deformation of sample itself was determined by subtracting the deformation amount of the device relative to a load from the respective data points when measured with load-displacement curve, and this was used for the following calculation. For the calculation, a compression elastic modulus was calculated using the load and the displacement at two points where linearity in the load-displacement curve can be satisfied. Because there is a possibility that the indenter does not come into contact with the entire surface of the sample at an initial stage applied with the load, a point of load of about 30 mN was employed as the point of the lower load side. However, in case where the lower load-side point defined here was in a non-linear region, a point of a minimum load, which can achieve an aberration between the straight line and the displacement within 0.1 μm, was employed. Further, a point of load of about 100 mN was employed as the point of the higher load side. Where, in case where the higher load-side point exceeded a load of a yield point, a straight line was depicted toward the higher load side along the load-displacement curve so as to pass through the lower load-side point, and a point of a maximum load, which can achieve an aberration between the straight line and the displacement within 0.1 μm, was employed as the higher load-side point. In the following equation, the calculation was carried out at a condition where "1" was referred to as 500 μm, as to the radius of single-fiber, the diameter of the sample was measured ten times before the test using an optical microscope, and the radius was employed as a value by determining an average value of the diameters measured above and calculating a half of the average diameter. Further, the load-displacement curve was measured five times per one sample, the compression elastic modulus was also calculated five times, and the average value was employed as a compression elastic modulus.

$$d=\{4P/(\pi lE_1)\}\{0.19+\sinh^{-1}(r/b)\} \text{ Here, } b^2=4rP/(\pi lE_1)$$ [Equation 3]

P: load
$E_1$: compression elastic modulus
l: sample length to be compressed
r: radius of single fiber
Device: superior precision material tester Model 15848 produced by Instron Corporation
Indenter: plane indenter made of diamond (a square with one side of 500 μm)
Test speed: 50 μm/min
Sampling speed: 0.1 second
Data processing system: "Merlin" produced by Instron Corporation Atmosphere for measurement: in an atmospheric air with a room temperature (23±2° C., 50±5% RH)

(8) Half Width of Peak at Wide Angle X-Ray Diffraction (Δ2 θ):

Fibers were cut out at 4 cm, and 20 mg thereof was weighed to prepare a sample. The measurement was carried out in a direction of an equator line relative to the fiber axis, and the conditions were as follows. At that time, a half width (Δ2 θ) of a peak observed at 2 θ=18 to 22° was measured.

X-ray generation unit: 4036A2 type produced by Rigaku Denki Corporation
X-ray source: CuK α ray (Ni filter used)
Output: 40 kV-20 mA
Goniometer: 2155D type produced by Rigaku Denki Corporation
Slit: 2 mmφ-1°-1°
Detector: scintillation counter
Count recorder: RAD-C type produced by Rigaku Denki Corporation
Measurement range: 2θ=5-60°
Step: 0.05°
Integrating time: 2 seconds (9) Birefringence (Δn):

Using a polarization microscope (BH-2 produced by Olympus Corporation), measurement was carried out 5 times per one sample by compensator method, and it was determined as an average value.

(10) Abrasion Resistance C Against Metal Material:

Fibers applied with a load of 1.23 cN/dtex were hung vertically, a ceramic rod guide (produced by Yuasa Itomichi Kogyo Corporation, Material; YM-99C) with a diameter of 4 mm was pushed onto the fibers at a contact angle of 2.7° in a direction perpendicular to the fiber, the fibers were scratched by the guide in a fiber axis direction at a stroke length of 30 mm and a stroke speed of 600 times/min, observation by a stereo microscope was carried out every 15 seconds, and the time up to a timing, at which white powder or generation of fibrillation on the rod guide or the fiber surface was observed, was measured, and a value as an average value of 5 measurements other than maximum and minimum values among 7 measurements was defined as abrasion resistance C. Where, the determination of the abrasion resistance C was also carried out for multifilament by a similar test method.

(11) Flexion Abrasion Resistance:

Both ends of fibers hung on a ceramic rod guide with a diameter of 4 mm (rod guide produced by Yuasa Itomichi Kogyo Corporation: Material; YM-99C, Hardness; Hv1800) at a contact angle of 90° were held by a stroke device (a yarn friction holding force tester produced by Toyo Seiki Seisakusho Corporation), the fibers were scratched at a stroke length of 30 mm and a stroke speed of 100 times/min while a stress of 0.88 cN/dtex was provided to the rod guide (provided in a direction so that a stress of 0.62 cN/dtex was provided to the fiber), and at a condition stopping the operation at each one stroke, the number of strokes recognized with white powder on the rod guide or generation of fibrillation on the fiber surface was measured, and it was determined as an average value of five measurements.

(12) Amount of Oil Adhesion, Determination of Adhesion of Polysiloxane Group Compound:

Taking fibers of 100 mg or more, the weight thereof after drying at 60° C. for 10 minutes was measured (W0), the fibers were dipped in a solution prepared by adding sodium dodecylbenzene sulfonate to water of 100 times or more of the fiber weight at 2.0 wt % relative to the fiber weight, the fibers were served to a ultrasonic wave cleaning for 20 minutes, the fibers after the cleaning were cleaned by water, the weight after drying at 60° C. for 10 minutes was measured (W1), and the amount of oil adhesion was calculated by the following equation.

$$\text{Amount of oil adhesion (wt \%)}=(W0-W1)\times 100/W1$$

Further, as to determination of adhesion of polysiloxane group compound, the solution after the ultrasonic wave cleaning was taken, this was served to IR measurement, and if a peak intensity of 1,050 to 1,150 cm$^{-1}$ originating from polysiloxane was 0.1 time or more relative to a peak intensity of 1,150 to 1,250 cm$^{-1}$ originating from sulfonic group of sodium dodecylbenzene sulfonate, it was determined that polysiloxane adhered to the fiber.

(13) Running Tension, Running Stress:

The measurement was carried out using a tension meter produced by Toray Engineering Co., Ltd. (MODEL TTM-101). Further, for a very low tension, a tension meter capable of measuring an accuracy of 0.01 g with a full scale of 5 g, which was modified from the above-described tension meter, was used. The unit of the measured running tension was converted, and by dividing it with a fineness of the fibers after treatment, the running stress was determined as a value with a unit of cN/dtex.

(14) Determination of Weavability and Characteristics of Fabric:

Using a polyester monofilament as a warp yarn in a rapier weaving machine, a weft driving test of a liquid crystal polyester fibers used as a weft yarn was carried out at a condition of weaving density of 250/inch (2.54 cm) for both of warp and weft yarns, at driving frequency of 100 times/min. At that time, the process passability was determined from the deposition of fibrils and scum on a yarn supply port (ceramic guide) in a test weaving at a width of 180 cm and a length of 100 cm, while the weavability was determined from the times of machine stopping due to yarn breakage and the fabric quality was determined from the number of fibrils and scum mixing into the yarn supply port. The respective determination standards are as follows. Where, the thickness of the woven fabric was measured using a dial thickness gauge produced by Peacock Corporation.

<Process Passability>

Fibrils and scum are not recognized by observation even after weaving: excellent (◉) Fibrils and scum are recognized after weaving, but a fiber running are not affected: good (○)
Fibrils and scum are recognized after weaving, and a fiber running tension increases: not satisfied (Δ)
Fibrils and scum were recognized during weaving, and the test weaving was stopped: not good (×)

37

\<Weavability\>
Machine stopping not more than 5 times: excellent (⊚)
Machine stopping 6-10 times: satisfied (○)
Machine stopping not less than 11 times: not good (×)
\<Fabric quality\>
Number of mixed fibrils and scum not more than 5 pieces; excellent (⊚), 6-10 pieces; good (○), not less than 10 pieces: not good (×)
(15) Determination of Scum Generation in Flexed Yarn Path:
The fibers of 50,000 m are hung on a ceramic rod guide with a diameter of 4 mm (rod guide produced by Yuasa Itomichi Kogyo Corporation: Material; YM-99C, Hardness; 1,800) at a contact angle of 90° and was driven at 200 m/min, and the process passability was determined from the deposition condition on a guide. The determination standards are as follows.
○: Scum is not recognized by observation
Δ: Scum is recognized by observation
(16) The Number of Fibrils:
About one layer of the yarn is removed from the surface, and all fibrils observed on the package surface are counted. Further, one more layer of the yarn is removed and the number of fibrils is counted 4 more times repeatedly. The number of fibrils (pieces/m$^2$) is defined as a quotient of division, where the number of fibrils counted in total 5 times is divided by the sum of package surface areas (m$^2$) observed in the 5 times.

Reference Example 1 p-hydroxy benzoic acid of 870 parts by weight, 4,4'-dihydroxy biphenyl of 327 parts by weight, hydroquinone of 89 parts by weight, terephthalic acid of 292 parts by weight, isophthalic acid of 157 parts by weight and acetic anhydride of 1460 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 335° C. for 4 hours. The polymerization temperature was kept at 335° C., the pressure was reduced down to 133 Pa for 1.5 hours, and further the reaction was continued for 40 minutes, and at the time when the torque reached 28 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 2 p-hydroxy benzoic acid of 870 parts by weight, 4,4'-dihydroxy biphenyl of 327 parts by weight, hydroquinone of 89 parts by weight, terephthalic acid of 292 parts by weight, isophthalic acid of 157 parts by weight and acetic anhydride of 1,433 parts by weight (1.08 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 330° C. for 4 hours. The polymerization temperature was kept at 300° C., the pressure was reduced down to 133 Pa for 1.5 hours, and further the reaction was continued for 20 minutes, and at the time when the torque reached 15 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 3 p-hydroxy benzoic acid of 1,008 parts by weight, 6-hydroxy-2-naphthoic acid of 508 parts by weight and acetic anhydride of 1,071 parts by weight (1.05 mol equivalent of the sum of phenolic hydride group) were charged into a reaction vessel with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 325° C. for 4 hours. The polymerization temperature was kept at 325° C., the pressure was reduced down to 133 Pa for 1.5 hours, and further the reaction was continued for 20 minutes, and at the time when the torque reached 15 kg·cm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 4

6-hydroxy-2-naphthoic acid of 38 parts by weight, 2,6-naphthalene dicarboxylic acid of 259 parts by weight, p-hydroxy benzoic acid of 1,022 parts by weight, hydroquinone of 132 parts by weight and acetic anhydride of 1,071 parts by weight (1.05 mol equivalent of the sum of phenolic hydride group) were charged into a reaction vessel with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 33° C.°C. for 4 hours. The polymerization temperature was kept at 335° C., the pressure was reduced down to 133 Pa for 1.5 hours, and further the reaction was continued for 30 minutes, and at the time when the torque reached 20 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 5 p-hydroxy benzoic acid of 808 parts by weight, 4,4'-dihydroxy biphenyl of 411 parts by weight, hydroquinone of 104 parts by weight, terephthalic acid of 314 parts by weight, isophthalic acid of 209 parts by weight and acetic anhydride of 1,364 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 300° C. for 4 hours. The polymerization temperature was kept at 300° C., the pressure was reduced down to 133 Pa for 1.5 hours, and further the reaction was continued for 20 minutes, and at the time when the torque reached 15 kg·cm, the condensation polymerization was completed. The polymerization temperature was kept at 300° C., the pressure was reduced down to 133 Pa for 1.5 hours, and further the reaction was continued for 20 minutes, and at the time when the torque reached 15 kg·cm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 6 p-hydroxy benzoic acid of 323 parts by weight, 4,4'-dihydroxy biphenyl of 436 parts by weight, hydroquinone of 109 parts by weight, terephthalic acid of 359 parts by weight, isophthalic acid of 194 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 325° C. for 4 hours. The polymerization temperature was kept at 325° C., the pressure was reduced down to 133 Pa for 1.5 hours, and further the reaction was continued for 20 minutes, and at the time when the torque reached 15 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 7 p-hydroxy benzoic acid of 895 parts by weight, 4,4'-dihydroxy biphenyl of 168 parts by weight, hydroquinone of 40 parts by weight, terephthalic acid of 135 parts by weight, isophthalic acid of 75 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 365° C. for 4 hours. The polymerization temperature was kept at 365° C., the pressure was reduced down to 133 Pa for 1.5 hours, and further the reaction was continued for 20 minutes, and at the time when the torque reached 15 kg·cm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 8 p-hydroxy benzoic acid of 671 parts by weight, 4,4'-dihydroxy biphenyl of 235 parts by weight, hydroquinone of 89 parts by weight, terephthalic acid of 224 parts by weight, isophthalic acid of 120 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 340° C. for 4 hours. The polymerization temperature was kept at 340° C., the pressure was reduced down to 133 Pa for 1.5 hours, and further the reaction was continued for 20 minutes, and at the time when the torque reached 15 kg·cm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 9 p-hydroxy benzoic acid of 671 parts by weight, 4,4'-dihydroxy biphenyl of 335 parts by weight, hydroquinone of 30 parts by weight, terephthalic acid of 224 parts by weight, isophthalic acid of 120 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 305° C. for 4 hours. The polymerization temperature was kept at 305° C., the pressure was reduced down to 133 Pa for 1.5 hours, and further the reaction was continued for 20 minutes, and at the time when the torque reached 15 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 10 p-hydroxy benzoic acid of 671 parts by weight, 4,4'-dihydroxy biphenyl of 268 parts by weight, hydroquinone of 69 parts by weight, terephthalic acid of 314 parts by weight, isophthalic acid of 30 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 355° C. for 4 hours. The polymerization temperature was kept at 355° C., the pressure was reduced down to 133 Pa for 1.5 hours, and further the reaction was continued for 20 minutes, and at the time when the torque reached 15 kgcm, the condensation polymerization was completed. Next, the inside of the reaction vessel was pressurized at 0.1 MPa, the polymer was discharged as a strand-like material through a die having one circular discharge port with a diameter of 10 mm, and it was pelletized by a cutter.

Reference Example 11 p-hydroxy benzoic acid of 671 parts by weight, 4,4'-dihydroxy biphenyl of 268 parts by weight, hydroquinone of 69 parts by weight, terephthalic acid of 150 parts by weight, isophthalic acid of 194 parts by weight and acetic anhydride of 1,011 parts by weight (1.10 equivalent of the sum of phenolic hydride group) were charged into a reaction vessel of 5 L with an agitating blade and a distillation tube, and after the temperature was elevated from a room temperature to 145° C. for 30 minutes while agitated under a nitrogen gas atmosphere, it was reacted at 145° C. for 2 hours. Thereafter, it was elevated to 310° C. for 4 hours. The polymerization temperature was kept at 310° C., the pressure was reduced down to 133 Pa for 1.5 hours, and further the reaction was continued for 20 minutes, and at the time when the torque reached 15 kg·cm, the condensation polymerization was completed. Next, the inside of the reaction vessel was pressurized at 0.1

MPa, the polymer was discharged as a strand-like material through a die having one circular discharge port with a diameter of 10 mm, and it was pelletized by a cutter.

The characteristics of the liquid crystal polyesters obtained in Reference Examples 1-11 are shown in Table 1. In any resin, when elevated in temperature in a nitrogen atmosphere by a hot stage and observed with a transmitted light of sample under a polarized light, an optical anisotropy (liquid crystallinity) was recognized. Where, the melt viscosity was determined using a drop type flow tester, at conditions of a temperature of melting point (Tm)+10° C. and a shear speed of 1,000/s.

thereafter, oil comprising water emulsion between a smoothing agent whose main constituent was polyether compound and an emulsifying agent whose main constituent is lauryl alcohol was provided, and all filaments were wound to the first godet roll. After this was passed through the second godet roll having the same speed, all filaments except for one were sucked by a suction gun, and the remaining one filament was wound in a pirn form via a dancer arm using a pirn winder (EFT type take-up winder produced by Kamitsu Seisakusho Corporation, no contact roller contacting with a take-up package). During the take-up, yarn breakage did not occur and the

TABLE 1

|  |  | Reference Example 1 | Reference Example 2 | Reference Example 3 | Reference Example 4 | Reference Example 5 | Reference Example 6 |
|---|---|---|---|---|---|---|---|
| Hydroxybenzoic acid unit [Structural unit (I)] | (mol %) | 54 | 54 | 73 | 74 | 48 | 26 |
| Dihydroxybiphenyl unit Structural unit (II) | (mol %) | 16 | 16 | 0 | 0 | 18 | 26 |
| Hydroquinon unit Structural unit (III) | (mol %) | 7 | 7 | 0 | 12 | 8 | 11 |
| Terephthalic acid unit Structural unit (IV) | (mol %) | 15 | 15 | 0 | 0 | 16 | 24 |
| Isophthalic acid unit Structural unit (V) | (mol %) | 8 | 8 | 0 | 0 | 10 | 13 |
| Hydroxynaphthoic acid unit | (mol %) | 0 | 0 | 27 | 2 | 0 | 0 |
| Naphthalenedicarboxylic acid unit | (mol %) | 0 | 0 | 0 | 12 | 0 | 0 |
| (I)/((I) + (II) + (III)) × 100 | (mol %) | 70 | 70 | 100 | 86 | 65 | 41 |
| (II)/((II) + (III)) × 100 | (mol %) | 70 | 70 | — | — | 69 | 70 |
| (IV)/((IV) + (V)) × 100 | (mol %) | 65 | 65 | — | — | 62 | 65 |
| Polymer property | Melting point (° C.) | 320 | 318 | 283 | 320 | 290 | 314 |
|  | Molecular weight (×10,000) | 10.4 | 9.1 | 23.0 | 20.5 | 8.9 | 8.6 |
|  | Melt viscosity (Pa·s) | 32 | 16 | 32 | 21 | 16 | 17 |

|  |  | Reference Example 7 | Reference Example 8 | Reference Example 9 | Reference Example 10 | Reference Example 11 |
|---|---|---|---|---|---|---|
| Hydroxybenzoic acid unit [Structural unit (I)] | (mol %) | 72 | 54 | 54 | 54 | 54 |
| Dihydroxybiphenyl unit Structural unit (II) | (mol %) | 10 | 14 | 20 | 16 | 16 |
| Hydroquinon unit: Structural unit (III) | (mol %) | 4 | 9 | 3 | 7 | 7 |
| Terephthalic acid unit Structural unit (IV) | (mol %) | 9 | 15 | 15 | 21 | 10 |
| Isophthalic acid unit Structural unit (V) | (mol %) | 5 | 8 | 8 | 2 | 13 |
| Hydroxynaphthoic acid unit | (mol %) | 0 | 0 | 0 | 0 | 0 |
| Naphthalenedicarboxylic acid unit | (mol %) | 0 | 0 | 0 | 0 | 0 |
| (I)/((I) + (II) + (III)) × 100 | (mol %) | 84 | 70 | 70 | 70 | 70 |
| (II)/((II) + (III)) × 100 | (mol %) | 71 | 61 | 87 | 70 | 70 |
| (IV)/((IV) + (V)) × 100 | (mol %) | 64 | 65 | 65 | 91 | 43 |
| Polymer property | Melting point (° C.) | 355 | 329 | 296 | 342 | 298 |
|  | Molecular weight (×10,000) | 9.3 | 9.0 | 9.0 | 9.6 | 8.6 |
|  | Melt viscosity (Pa·s) | 16 | 18 | 16 | 17 | 17 |

Desirable embodiments of the liquid crystal polyester fibers according to the present invention will be explained by Example 1 and Comparative Examples 1-4.

Example 1

Using the liquid crystal polyester of Reference Example 1, after a vacuum drying was carried out at 160° C. for 12 hours, it was melt extruded by a single-screw extruder of φ15 mm produced by Osaka Seiki Kosaku Corporation, and the polymer was supplied to a spinning pack while metered by a gear pump. In the spinning pack, the polymer was filtered using a metal nonwoven fabric filter, and the polymer was discharged from a die. The discharged polymer was cooled and solidified from the outer side of the yarn by an annular cooling air wind after passing through a heat retaining region of 40 mm, and spinnability was good. Spinning conditions and spun fiber characteristics are shown in Table 2.

The fibers were rolled back before the solid-phase polymerization from this spun fiber package by SSP-MV type rewinder (contact length of 200 mm, the number of winding of 8.7, taper angle of 45°) produced by Kamitsu Seisakusho Corporation. The spun fibers are unrolled in a vertical direction (in a direction perpendicular to the fiber rounding direction), and without through a speed-regulating roller, oil of water emulsion including polydimethylsiloxane (SH200 produced by Dow Corning Toray Corporation) of 5 wt % was supplied using an oiling roller (having a stainless-steel roll with pearskin-finished surface). Where, a stainless-steel bobbin with holes and wound thereon with a Kevlar felt (weight: 280 g/m2, thickness: 1.5 mm) was used as a core member for the roll-back, and the surface pressure was set to 100 gf. The roll-back conditions are shown in Table 3.

Next, the bobbin with holes was detached from the package rolled back, solid-phase polymerization was performed in a condition of a package where the fibers were taken up on the Kevlar felt. The temperature program for the solid-phase polymerization was such that, temperature was elevated from a room temperature to 240° C. for about 30 minutes using a closed type oven, after it was kept at 240° C. for 3 hours, it was elevated to the final temperature at a temperature elevation speed of 4° C./hour, and further kept at the final temperature. Where, as the atmosphere, dehumidified nitrogen was supplied at a flow rate of 20 NL/min, and it was discharged from an exhaust port so as not to pressurize the inside. Solid-phase polymerization conditions and fiber characteristics after solid-phase polymerization are shown in Table 3.

Finally fibers were unrolled from a package after solid-phase polymerization, performing successively oil removal (washing) and high-temperature non-contact heat treatment. The package after the solid-phase polymerization was attached to a free roll creel, which had an axis, bearings and a freely-rotatable outer layer and which had no brakes and no drive source, and therefrom a yarn was drawn out in a lateral direction (in a fiber rounding direction), and continuously, the fibers were inserted into a bath (with no guides to contact to fibers inside) provided with slits at both ends, and the oil was removed by washing. The wash water containing nonionic-anionic surfactant (Gran Up US-30 produced by Sanyo Chemical Industries Corporation) by 1.0 wt % was controlled to 50° C. in an external tank, and was supplied into a water tank by a pump. It was supplied into the water tank through a pipe having holes every 5 cm in the water tank, so as to give liquid flow through the pipe in the water tank. In addition, provided was a mechanism where wash water, which had been overflowed from slits and holes for adjusting water level, was returned to the external tank.

The washed fibers were passed through the first roller having a separate roller, after passing through a bearing roller guide. Because the creel is a free roll, this roller is supposed to draw fibers so as to unroll from the solid-phase polymerized package and to drive fibers. Here, in order to make sure of wash effect, the washed fibers were taken up as being wound on the first roller, and then oil adhesion was determined as 0.4 wt %. It can be understood that the washing makes it possible to reduce the oil adhesion amount.

The fibers which had passed through the first roller were passed through a slit heater to be subjected to high-temperature heat treatment. The slit heater was not provided with guides inside, without contact between the heater and the fiber. The fibers which had passed through the heater were passed through the second roller having a separate roller. Speeds are set to the same between the first roller and the second roller. The fibers which had passed through the second roller were given oil, which comprises water emulsion between a smoothing agent whose main constituent is polyether compound and an emulsifier whose main constituent is lauryl alcohol, as using an oiling roller made of ceramic, and was taken up by a winder (ET-8T type speed-regulating winder produced by Kamitsu Seisakusho Corporation). The conditions for take-up were, tension of 15 gf, surface pressure of 120 gf, taper angle of 60°, number of winding of 8.7, contact length of 200 mm. Conditions of unrolling, washing, high-temperature heat treatment and fiber characteristics after high-temperature heat treatment, are shown in Table 4. Where, Δn of the liquid crystal polyester fiberd was 0.35, which showed a high orientation.

As shown in Table 4, the fibers of Example 1 have high strength, high elastic modulus, high elongation and high abrasion resistance. In addition, it has small variable waveform of U % H and small value of variable at outer diameter measurement, and is excellent in uniformity of fiber diameter in lengthwise direction.

Results of determining test weaving of the fibers are shown in Table 4. Because they were superior in uniformity of fiber diameter in lengthwise direction, having high abrasion resistance, excellent were in process passability, weavability and fabric quality. Because neither defective fiber diameter nor defective opening was observed, it would be expected to have superior characteristics without any defects when is made into creen gauze for printing or a mesh for filters.

TABLE 2

| | | | Example 1 | Example 2 | Example 3 | Example 4 | Example 5 | Example 6 | Example 7 | Example 8 |
|---|---|---|---|---|---|---|---|---|---|---|
| | Resin | | Reference Example 1 | Reference Example 1 | Reference Example 1 | Reference Example 1 | Reference Example 2 | Reference Example 3 | Reference Example 4 | Reference Example 5 |
| Spinning condition | Spinning temperature | ° C. | 350 | 350 | 350 | 350 | 345 | 325 | 345 | 320 |
| | Amount of discharge | g/min | 3.0 | 4.2 | 3.0 | 3.0 | 3.0 | 3.0 | 3.0 | 3.0 |
| | Hole diameter of die | mm | 0.13 | 0.10 | 0.13 | 0.10 | 0.13 | 0.13 | 0.13 | 0.13 |
| | Land length | mm | 0.26 | 0.18 | 0.26 | 0.18 | 0.26 | 0.26 | 0.26 | 0.26 |
| | L/D | — | 2.0 | 1.8 | 2.0 | 1.8 | 2.0 | 2.0 | 2.0 | 2.0 |
| | Number of holes | — | 5 | 10 | 5 | 10 | 5 | 5 | 5 | 5 |
| | Spinning speed | m/min | 1000 | 1200 | 600 | 1000 | 1000 | 600 | 600 | 1000 |
| | Spinning draft | | 27 | 27 | 16 | 31 | 27 | 16 | 16 | 27 |
| | Winding time | min | 200 | 125 | 300 | 200 | 200 | 300 | 300 | 200 |
| | Spinnability | — | ◎ | ○ | ◎ | ◎ | ◎ | ○ | ○ | ◎ |
| Characteristics of spun fiber | Fineness | dtex | 6.0 | 3.5 | 10.0 | 30.0 | 6.0 | 10.0 | 10.0 | 6.0 |
| | Fluctuation rate of fineness | % | 4 | 6 | 3 | 2 | 3 | 4 | 6 | 4 |
| | Number of filaments | — | 1 | 1 | 1 | 10 | 1 | 1 | 1 | 1 |
| | Fineness of single fiber | dtex | 6.0 | 3.5 | 10.0 | 3.0 | 6.0 | 10.0 | 10.0 | 6.0 |
| | Strength | cN/dtex | 6.8 | 5.9 | 6.6 | 6.5 | 5.9 | 7.4 | 7.2 | 5.2 |
| | Fluctuation rate of tenacity | % | 9 | 15 | 8 | 6 | 10 | 9 | 12 | 15 |

TABLE 2-continued

|  |  |  |  |  |  |  |  |  |  |
|---|---|---|---|---|---|---|---|---|---|
| Elongation | % | 1.5 | 1.3 | 1.5 | 1.4 | 1.3 | 1.6 | 1.7 | 1.2 |
| Elastic modulus | cN/dtex | 521 | 553 | 504 | 511 | 504 | 541 | 487 | 424 |
| Tm1 | °C. | 302 | 305 | 301 | 302 | 300 | 276 | 320 | 278 |
| ΔHm1 | J/g | 2.7 | 2.9 | 2.6 | 2.7 | 3.0 | 6.1 | 9.3 | 2.5 |
| Half width of peak at Tm1 | °C. | 37 | 38 | 36 | 36 | 41 | 43 | 35 | 37 |
| Tc | °C. | 235 | 234 | 237 | 236 | 234 | 233 | 286 | 227 |
| ΔHc | J/g | 1.0 | 1.0 | 1.1 | 1.0 | 1.0 | 4.7 | 9.5 | 1.1 |
| Tm2 | °C. | 328 | 329 | 328 | 327 | 315 | 278 | 320 | 288 |
| ΔHm2 | J/g | 1.1 | 1.1 | 1.2 | 1.1 | 1.2 | 2.8 | 5.7 | 1.3 |

|  |  |  | Example 9 | Example 10 | Example 11 | Example 12 | Example 13 | Example 14 |
|---|---|---|---|---|---|---|---|---|
|  | Resin |  | Reference Example 6 | Reference Example 7 | Reference Example 8 | Reference Example 9 | Reference Example 10 | Reference Example 11 |
| Spinning condition | Spinning temperature | °C. | 340 | 375 | 360 | 320 | 370 | 320 |
|  | Amount of discharge | g/min | 3.0 | 3.0 | 3.0 | 3.0 | 3.0 | 3.0 |
|  | Hole diameter of die | mm | 0.13 | 0.13 | 0.13 | 0.13 | 0.13 | 0.13 |
|  | Land length | mm | 0.26 | 0.26 | 0.26 | 0.26 | 0.26 | 0.26 |
|  | L/D | — | 2.0 | 2.0 | 2.0 | 2.0 | 2.0 | 2.0 |
|  | Number of holes | — | 5 | 5 | 5 | 5 | 5 | 5 |
|  | Spinning speed | m/min | 1000 | 1000 | 1000 | 1000 | 1000 | 1000 |
|  | Spinning draft |  | 27 | 27 | 27 | 27 | 27 | 27 |
|  | Winding time | min | 200 | 200 | 200 | 200 | 200 | 200 |
|  | Spinnability | — | ◉ | ○ | ◉ | ◉ | ◉ | ◉ |
| Characteristics of spun fiber | Fineness | dtex | 6.0 | 6.0 | 6.0 | 6.0 | 6.0 | 6.0 |
|  | Fluctuation rate of fineness | % | 4 | 6 | 4 | 4 | 14 | 11 |
|  | Number of filaments | — | 1 | 1 | 1 | 1 | 1 | 1 |
|  | Fineness of single fiber | dtex | 6.0 | 6.0 | 6.0 | 6.0 | 6.0 | 6.0 |
|  | Strength | cN/dtex | 5.4 | 5.0 | 5.1 | 5.2 | 5.3 | 5.2 |
|  | Fluctuation rate of tenacity | % | 10 | 15 | 12 | 15 | 19 | 18 |
|  | Elongation | % | 1.2 | 1.1 | 1.2 | 1.2 | 1.2 | 1.2 |
|  | Elastic modulus | cN/dtex | 437 | 572 | 481 | 469 | 541 | 475 |
|  | Tm1 | °C. | 291 | 335 | 305 | 280 | 321 | 282 |
|  | ΔHm1 | J/g | 2.5 | 2.4 | 2.6 | 2.8 | 2.4 | 2.6 |
|  | Half width of peak at Tm1 | °C. | 40 | 41 | 40 | 41 | 40 | 41 |
|  | Tc | °C. | 234 | 277 | 236 | 221 | 266 | 228 |
|  | ΔHc | J/g | 1.0 | 1.2 | 1.0 | 0.9 | 1.0 | 1.1 |
|  | Tm2 | °C. | 313 | 351 | 327 | 295 | 339 | 295 |
|  | ΔHm2 | J/g | 1.1 | 1.1 | 1.1 | 1.2 | 1.2 | 1.3 |

TABLE 3

|  |  |  | Example 1 | Comparative Example 2 | Example 2 | Example 3 | Example 4 | Example 5 | Example 6 | Example 7 |
|---|---|---|---|---|---|---|---|---|---|---|
|  | Spun fiber |  | Example 1 | Example 1 | Example 2 | Example 3 | Example 4 | Example 5 | Example 6 | Example 7 |
| Roll-back | Winding tension | cN/dtex | 0.42 | 0.05 | 0.57 | 0.3 | 0.17 | 0.42 | 0.25 | 0.25 |
|  | Roll-back speed | m/min | 400 | 200 | 300 | 400 | 400 | 400 | 300 | 300 |
|  | Surface pressure | gf | 100 | 0 | 50 | 200 | 100 | 100 | 200 | 200 |
|  | Winding amount | kg | 0.13 | 0.13 | 0.06 | 0.19 | 0.64 | 0.13 | 0.19 | 0.19 |
|  | Winding amount | ×10,000 m | 20 | 20 | 15 | 18 | 20 | 20 | 18 | 18 |
|  | Winding density | g/cc | 0.40 | 0.08 | 0.47 | 0.35 | 0.25 | 0.40 | 0.31 | 0.31 |
| Final temperature of solid-phase polymerization |  | °C. | 300 | 300 | 300 | 300 | 300 | 295 | 265 | 300 |
| Treatment time at final temperature |  | hr | 20 | 20 | 20 | 20 | 20 | 20 | 20 | 20 |
| Characteristics of solid-phase polymerized fiber | Molecular weight | ×10,000 | 40.5 | 41.2 | 42.5 | 40.1 | 40.6 | 42.3 | 95.3 | 73.1 |
|  | Fineness | dtex | 6.3 | 6.3 | 3.7 | 10.4 | 31.8 | 6.3 | 10.4 | 10.4 |
|  | Fluctuation rate of fineness | % | 5 | 6 | 7 | 4 | 2 | 4 | 5 | 6 |
|  | Number of filaments | — | 1 | 1 | 1 | 1 | 10 | 1 | 1 | 1 |
|  | Fineness of single fiber | dtex | 6.3 | 6.3 | 3.7 | 10.4 | 3.2 | 6.3 | 10.4 | 10.4 |
|  | Strength | cN/dtex | 21.8 | 20.4 | 20.1 | 21.1 | 21.5 | 24.6 | 23.3 | 21.4 |
|  | Fluctuation rate of tenacity | % | 8 | 8 | 18 | 8 | 7 | 9 | 10 | 12 |

TABLE 3-continued

|  |  |  |  |  |  |  |  |  |  |
|---|---|---|---|---|---|---|---|---|---|
| Elongation | % | 2.9 | 2.8 | 2.6 | 3.0 | 2.8 | 3.0 | 3.1 | 3.0 |
| Eelastic modulus | cN/dtex | 984 | 977 | 986 | 974 | 991 | 1032 | 880 | 968 |
| Compression elastic modulus | GPa | 0.28 | 0.28 | 0.32 | 0.27 | 0.35 | 0.29 | 0.58 | 0.57 |
| Δ2θ | ° | 1.3 | 1.3 | 1.3 | 1.3 | 1.3 | 1.3 | 1.3 | 1.3 |
| Tm1 | °C. | 333 | 334 | 333 | 334 | 334 | 331 | 322 | 332 |
| ΔHm1 | J/g | 8.7 | 8.9 | 9.2 | 8.7 | 9.5 | 9.1 | 10.6 | 14.7 |
| Peak half-width at Tm1 | °C. | 10 | 10 | 10 | 11 | 9 | 11 | 8 | 5 |
| Tc | °C. | 274 | 275 | 275 | 274 | 276 | 272 | 227 | 280 |
| ΔHc | J/g | 3.5 | 3.5 | 3.4 | 3.4 | 3.6 | 3.5 | 3.4 | 8.4 |
| Tm2 | °C. | 330 | 330 | 330 | 329 | 329 | 329 | 317 | 331 |
| ΔHm2 | J/g | 1.1 | 1.1 | 1.2 | 1.2 | 1.1 | 1.2 | 1.8 | 7.5 |
| Oil adhesion amount | wt % | 4.5 | 4.4 | 5.0 | 4.0 | 6.0 | 4.5 | 4.2 | 4.2 |
| Polysiloxane adhesion | — | present | present | present | present | present | present | present | present |
| Abrasion resistance C | sec | 11 | 11 | 8 | 12 | 15 | 11 | 1 | 3 |

|  |  |  | Example 8 | Example 9 | Example 10 | Example 11 | Example 12 | Example 13 | Example 14 |
|---|---|---|---|---|---|---|---|---|---|
| Roll-back | Spun fiber |  | Example 8 | Example 9 | Example 10 | Example 11 | Example 12 | Example 13 | Example 14 |
|  | Winding tension | cN/dtex | 0.42 | 0.42 | 0.42 | 0.42 | 0.42 | 0.42 | 0.42 |
|  | Roll-back speed | m/min | 400 | 400 | 400 | 400 | 400 | 400 | 400 |
|  | Surface pressure | gf | 100 | 100 | 100 | 100 | 100 | 100 | 100 |
|  | Winding amount | kg | 0.13 | 0.13 | 0.13 | 0.13 | 0.13 | 0.13 | 0.13 |
|  | Winding amount | ×10,000 m | 20 | 20 | 20 | 20 | 20 | 20 | 20 |
|  | Winding density | g/cc | 0.40 | 0.40 | 0.40 | 0.40 | 0.40 | 0.40 | 0.40 |
| Final temperature of solid-phase polymerization |  | °C. | 280 | 295 | 330 | 310 | 285 | 325 | 285 |
| Treatment time at final temperature |  | hr | 20 | 20 | 20 | 20 | 20 | 20 | 20 |
| Characteristics of solid-phase polymerized fiber | Molecular weight | ×10,000 | 41.4 | 40.7 | 43.4 | 42.5 | 42.3 | 43.6 | 40.8 |
|  | Fineness | dtex | 6.3 | 6.3 | 6.3 | 6.3 | 6.3 | 6.3 | 6.3 |
|  | Fluctuation rate of fineness | % | 4 | 5 | 6 | 5 | 5 | 15 | 12 |
|  | Number of filaments | — | 1 | 1 | 1 | 1 | 1 | 1 | 1 |
|  | Fineness of single fiber | dtex | 6.3 | 6.3 | 6.3 | 6.3 | 6.3 | 6.3 | 6.3 |
|  | Strength | cN/dtex | 20.6 | 18.6 | 22.1 | 24.9 | 22.6 | 25.4 | 22.8 |
|  | Fluctuation rate of tenacity | % | 16 | 1.1 | 19 | 16 | 15 | 20 | 19 |
|  | Elongation | % | 2.9 | 2.9 | 2.8 | 2.7 | 2.8 | 2.7 | 2.8 |
|  | Eelastic modulus | cN/dtex | 845 | 702 | 803 | 924 | 871 | 952 | 973 |
|  | Compression elastic modulus | GPa | 0.27 | 0.26 | 0.33 | 0.28 | 0.27 | 0.31 | 0.28 |
|  | Δ2θ | ° | 1.4 | 1.4 | 1.3 | 1.3 | 1.2 | 1.3 | 1.4 |
|  | Tm1 | °C. | 311 | 329 | 361 | 345 | 310 | 355 | 312 |
|  | ΔHm1 | J/g | 7.4 | 7.6 | 9.3 | 9.2 | 8.1 | 8.7 | 7.9 |
|  | Peak half-width at Tm1 | °C. | 10 | 11 | 11 | 11 | 11 | 11 | 10 |
|  | Tc | °C. | 256 | 264 | 301 | 284 | 254 | 295 | 254 |
|  | ΔHc | J/g | 3.3 | 3.3 | 3.3 | 3.2 | 3.2 | 3.4 | 3.2 |
|  | Tm2 | °C. | 306 | 333 | 356 | 347 | 318 | 351 | 313 |
|  | ΔHm2 | J/g | 1.4 | 1.2 | 1.5 | 1.3 | 1.3 | 1.3 | 1.4 |
|  | Oil adhesion amount | wt % | 4.5 | 4.5 | 4.5 | 4.5 | 4.5 | 4.5 | 4.5 |
|  | Polysiloxane adhesion | — | present | present | present | present | present | present | present |
|  | Abrasion resistance C | sec | 11 | 8 | 7 | 11 | 9 | 8 | 12 |

TABLE 4

|  |  |  | Example 1 | Comparative Example | Comparative Example 4 | Example 2 | Example 3 | Example 4 | Example 5 | Example 6 | Example 7 |
|---|---|---|---|---|---|---|---|---|---|---|---|
| Fiber subjected to heat treatment (Solid-phase polymerization system) |  |  | Example 1 | Example 1 | Example 1 | Example 2 | Example 3 | Example 4 | Example 5 | Example 6 | Example 7 |
| Unrolling | Unrolling speed | m/min | 400 | 200 | 200 | 300 | 400 | 500 | 400 | 300 | 300 |
| Washing | Bath length | mm | 1500 | 1500 | 1500 | 1200 | 1500 | 1500 | 1500 | 1200 | 1200 |
|  | Unrolling - Heat treatment Successive/Not successive |  | Successive | Not successive | No heat treatment | Successive | Successive | Successive | Successive | Successive | Successive |
| High-temperature heat treatment | Treatment temperature | °C. | 490 | 490 | No heat treatment | 450 | 490 | 480 | 480 | 480 | 490 |
|  | Treatment length | mm | 1000 | 1000 |  | 750 | 1000 | 1000 | 1000 | 750 | 750 |
|  | Treatment speed | m/min | 400 | 400 |  | 300 | 400 | 500 | 400 | 300 | 300 |
|  | Treatment time | sec | 0.15 | 0.15 |  | 0.15 | 0.15 | 0.12 | 0.15 | 0.15 | 0.15 |
|  | Running tension | gf | 1.0 | 1.0 |  | 1.0 | 1.5 | 3.0 | 1.0 | 1.0 | 1.0 |
|  | Running stress | cN/dtex | 0.16 | 0.16 |  | 0.28 | 0.15 | 0.10 | 0.16 | 0.10 | 0.10 |
|  | Running stability | — | ◯ | Δ |  | Δ | ◯ | ◯ | ◯ | Δ | Δ |

TABLE 4-continued

| Characteristics high-temp. heat treated fiber (Characteristics of fiber served to test weaving) | Yarn length | ×10,000 m | 20 | 20 | 20 | 15 | 18 | 20 | 20 | 15 | 15 |
|---|---|---|---|---|---|---|---|---|---|---|---|
| | Molecular weight | ×10,000 | 40.5 | 40.5 | 40.5 | 40.4 | 40.1 | 40.6 | 42.2 | 95.2 | 73 |
| | Fineness | dtex | 6.0 | 6.0 | 6.0 | 3.5 | 10.1 | 30.3 | 6.0 | 10.1 | 10.1 |
| | Fluctuation rate of fineness | % | 4 | 5 | 5 | 6 | 4 | 2 | 3 | 4 | 5 |
| | Variable waveform of U % H | % | 5 | 12 | 13 | 7 | 4 | 3 | 6 | 9 | 8 |
| | Value of variable at outer diameter measurement | % | 12 | 38 | 32 | 14 | 11 | 7 | 13 | 24 | 21 |
| | Number of filaments | — | 1 | 1 | 1 | 1 | 1 | 10 | 1 | 1 | 1 |
| | Fineness of single fiber | dtex | 6.0 | 6.0 | 6.0 | 3.5 | 10.1 | 3.0 | 6.0 | 10.1 | 10.1 |
| | Strength | cN/dtex | 15.8 | 15.7 | 21.7 | 14.2 | 15.5 | 15.6 | 16.8 | 17.5 | 15.9 |
| | Fluctuation rate of tenacity | % | 7 | 8 | 11 | 12 | 6 | 6 | 6 | 9 | 10 |
| | Elongation | % | 2.8 | 2.8 | 2.8 | 2.4 | 2.9 | 2.7 | 2.9 | 3.0 | 2.9 |
| | Elastic modulus | cN/dtex | 712 | 704 | 974 | 743 | 703 | 711 | 716 | 586 | 643 |
| | Compression elastic modulus | GPa | 0.20 | 0.20 | 0.28 | 0.20 | 0.20 | 0.24 | 0.19 | 0.58 | 0.56 |
| | Δ2θ | ° | 2.8 | 2.8 | 1.3 | 2.6 | 2.9 | 2.9 | 2.9 | 2.7 | 2.7 |
| | Tm1 | ° C. | 319 | 318 | 332 | 318 | 320 | 320 | 318 | 302 | 322 |
| | Exothermic peak | J/g | none | none | none | none | none | none | none | none | none |
| | ΔHm1 | J/g | 0.9 | 0.9 | 8.7 | 1.5 | 1.0 | 0.9 | 1.2 | 0.6 | 0.9 |
| | Peak half width at Tm1 | ° C. | 26 | 27 | 10 | 22 | 25 | 26 | 28 | 24 | 22 |
| | Tc | ° C. | 275 | 275 | 274 | 276 | 275 | 275 | 276 | 231 | 278 |
| | ΔHc | J/g | 3.6 | 3.5 | 3.4 | 3.6 | 3.5 | 3.5 | 3.8 | 2.7 | 8.5 |
| | Tm2 | ° C. | 330 | 331 | 330 | 330 | 329 | 330 | 330 | 317 | 331 |
| | ΔHm2 | J/g | 1.4 | 1.4 | 1.1 | 1.3 | 13 | 1.3 | 1.4 | 2.2 | 4.7 |
| | Oil adhesion amount | wt % | 0.6 | 0.5 | 0.5 | 0.6 | 0.5 | 1.0 | 0.7 | 0.9 | 0.9 |
| | Polysiloxane adhesion | — | present | present | present | present | present | present | present | present | present |
| | Abrasion resistance C | sec | 115 | 102 | 4 | 67 | 93 | 142 | 86 | 31 | 48 |
| Weaving | Process passability | — | ◎ | Δ | X | ◎ | ◎ | ◎ | ◎ | ○ | ○ |
| | Weavability (Number of stops) | — | ◎ (2 times) | X (12 times) | — | ○ (7 times) | ◎ (once) | ◎ (once) | ◎ (3 times) | ○ (9 times) | ○ (9 times) |
| | Fabric quality (Number of fibrils, scums) | — | ◎ (2 pieces) | X (13 pieces) | — | ○ (8 pieces) | ◎ (1 piece) | ◎ (0 piece) | ◎ (2 pieces) | ○ (9 pieces) | ○ (8 pieces) |

| | | | Example 8 | Example 9 | Example 10 | Example 11 | Example 12 | Example 13 | Example 14 |
|---|---|---|---|---|---|---|---|---|---|
| | Fiber subjected to heat treatment (Solid-phase polymerization system) | | Example 8 | Example 9 | Example 10 | Example 11 | Example 12 | Example 13 | Example 14 |
| Unrolling | Unrolling speed | m/min | 400 | 400 | 400 | 400 | 400 | 400 | 400 |
| Washing | Bath length | mm | 1500 | 1500 | 1500 | 1500 | 1500 | 1500 | 1500 |
| | Unrolling - Heat treatment Successive/Not successive | | Successive | Successive | Successive | Successive | Successive | Successive | Successive |
| High-temperature heat treatment | Treatment temperature | ° C. | 460 | 480 | 510 | 490 | 460 | 500 | 460 |
| | Treatment length | mm | 1000 | 1000 | 1000 | 1000 | 1000 | 1000 | 1000 |
| | Treatment speed | m/min | 400 | 400 | 400 | 400 | 400 | 400 | 400 |
| | Treatment time | sec | 0.15 | 0.15 | 0.15 | 0.15 | 0.15 | 0.15 | 0.15 |
| | Running tension | gf | 1.0 | 1.0 | 1.0 | 1.0 | 1.0 | 1.0 | 1.0 |
| | Running stress | cN/dtex | 0.16 | 0.16 | 0.16 | 0.16 | 0.16 | 0.16 | 0.16 |
| | Running stability | — | ○ | ○ | ○ | ○ | ○ | Δ | Δ |
| Characteristics high-temp. heat treated fiber (Characteristics of fiber served to test weaving) | Yarn length | ×10,000 m | 20 | 20 | 20 | 20 | 20 | 20 | 20 |
| | Molecular weight | ×10,000 | 41.3 | 40.7 | 43.4 | 42.4 | 42.3 | 43.6 | 40.7 |
| | Fineness | dtex | 6.0 | 6.0 | 6.0 | 6.0 | 6.0 | 6.0 | 6.0 |
| | Fluctuation rate of fineness | % | 4 | 4 | 5 | 4 | 4 | 14 | 11 |
| | Variable waveform of U % H | % | 6 | 6 | 7 | 6 | 6 | 9 | 8 |
| | Value of variable at outer diameter measurement | % | 13 | 14 | 13 | 14 | 13 | 19 | 18 |
| | Number of filaments | — | 1 | 1 | 1 | 1 | 1 | 1 | 1 |
| | Fineness of single fiber | dtex | 6.0 | 6.0 | 6.0 | 6.0 | 6.0 | 6.0 | 6.0 |
| | Strength | cN/dtex | 14.0 | 13.9 | 13.8 | 16.2 | 15.3 | 16.8 | 15.6 |
| | Fluctuation rate of tenacity | % | 13 | 9 | 17 | 14 | 13 | 18 | 18 |
| | Elongation | % | 2.9 | 2.7 | 1.9 | 2.7 | 2.8 | 2.7 | 2.8 |
| | Elastic modulus | cN/dtex | 596 | 556 | 697 | 636 | 595 | 654 | 601 |
| | Compression elastic modulus | GPa | 0.18 | 0.17 | 0.26 | 0.24 | 0.24 | 0.25 | 0.24 |
| | Δ2θ | ° | 2.8 | 2.8 | 2.8 | 2.8 | 2.8 | 2.8 | 2.8 |
| | Tm1 | ° C. | 303 | 321 | 351 | 336 | 305 | 343 | 304 |
| | Exothermic peak | J/g | none | none | none | none | none | none | none |
| | ΔHm1 | J/g | 1.8 | 1.0 | 1.8 | 2.1 | 2.4 | 2.0 | 2.4 |
| | Peak half width at Tm1 | ° C. | 36 | 29 | 20 | 28 | 40 | 23 | 37 |
| | Tc | ° C. | 252 | 283 | 311 | 294 | 256 | 299 | 264 |
| | ΔHc | J/g | 2.7 | 2.8 | 3.4 | 3.1 | 2.9 | 3.3 | 2.9 |
| | Tm2 | ° C. | 307 | 334 | 356 | 347 | 317 | 351 | 312 |

TABLE 4-continued

| | | | | | | | | | |
|---|---|---|---|---|---|---|---|---|---|
| | | ΔHm2 | J/g | 1.0 | 1.0 | 1.1 | 1.1 | 1.2 | 1.0 | 1.0 |
| | | Oil adhesion amount | wt % | 0.6 | 0.6 | 0.6 | 0.6 | 0.6 | 0.6 | 0.6 |
| | | Polysiloxane adhesion | — | present | present | present | present | present | present | present |
| | | Abrasion resistance C | sec | 63 | 58 | 57 | 56 | 55 | 50 | 53 |
| Weaving | | Process passability | — | ◎ | ◎ | ◎ | ◎ | ◎ | ◎ | ◎ |
| | | Weavability | — | ○ | ○ | ○ | ○ | ○ | ○ | ○ |
| | | (Number of stops) | | (6 times) | (7 times) | (6 times) | (7 times) | (6 times) | (8 times) | (8 times) |
| | | Fabric quality | — | ○ | ○ | ○ | ○ | ○ | ○ | ○ |
| | | (Number of fibrils, scums) | | (6 pieces) | (7 pieces) | (7 pieces) | (7 pieces) | (7 pieces) | (8 pieces) | (8 pieces) |

Comparative Example 1

The solid-phased polymerized package obtained by the same method of Example 1, after unrolled and washed like Example 1, was once taken up by ET-8T type speed-regulating winder produced by Kamitsu Seisakusho Corporation. This process corresponds to being taken up after passing through the first roller, in relation with Example 1. The conditions for take-up were, tension of 15 gf, surface pressure of 120 gf, taper angle of 60°, number of winding of 8.7, contact length of 200 mm Though it had been unrolled at 400 m/min, washed and taken up like Example 1 at first, the winder often caused yarn breakages and then, it was taken up as lowering the speed to 200 m/min. The fibers were drawn out from the taken-up fiber package in a warp direction (direction perpendicular to fiber rounding direction), and was subjected to high-temperature heat treatment like Example 1. This process corresponds to a process where the package is put in front of the first roller and where fibers are supplied as warp-taken unrolling, in relation to Example 1. During high-temperature heat treatment, fluff, which was suspected as a fibril, was wound, and particularly in the latter half of treatment, the yarn was unstably taken off as deteriorating the running stability. Conditions of unrolling, washing and high-temperature heat treatment, fiber characteristics after high-temperature heat treatment are shown in Table 4.

As shown in Table 4, though the fibers of Comparative Example 1 have high strength, high elastic modulus, high elongation and high abrasion resistance, they have large variable waveform of U % H and large value of variable at outer diameter measurement, and are inferior in uniformity of fiber diameter in lengthwise direction. It is probably because fibrils are generated when the solid-phase polymerized liquid crystal polyester fibers are once taken up. Results of determining test weaving of the fibers are shown in Table 4, where the process passability is "not satisfied", and the weavability and fabric quality are "not good". Because defects of fabric quality are remarkable particularly in the latter half of weaving, it can be guessed that deterioration of process passability, weavability and fabric quality were caused by many defects, such as fibrillations and rolling fibril deposits up in the inner layer of heat treated fibers, where the inner layer corresponds to the outer layer of solid-phase polymerized fibers after taken up once.

Comparative Example 2

From the spun fiber package obtained by the same method of Example 1, the fibers were unrolled in a warp direction like Example 1 of Patent document 2, and were rolled back by a winder (ET-68S speed-regulating winder produced by Kamitsu Seisakusho Corporation), not via a speed-regulating roller. Though the core member for roll-back was the same of Example 1, the surface pressure was not given, and the package form was a taper-end winding with taper angle of 20°, as shaking the traverse width constantly by a modified mechanism to adjust the taper width. The roll-back conditions are shown in Table 3. This was polymerized in solid-phase like Example 1. Fiber characteristics are shown in Table 3, though the characteristics in this stage are similar to Example 1. Although this was tried to unroll and wash in the same method of Example 1, yarn breakages were often caused and finally the determination was stopped because those yarn breakage were caused even if the speed was lowered to 200 m/min. Thus, the roll-back was performed without surface pressure given by the same method of Example 1 in Patent document 2, so that the winding density decreased. Therefore, when the unrolling was performed without using a feeding device, the unrolling tension might have increased to deform the package as causing the yarn breakages. In addition, because end surface was collapsed as constantly shaking the taper width when rolled back before solid-phase polymerization, the end surface might have been formed in the taper portion, as changing the diameter so that unrolling at constant speed became difficult, so as to cause the yarn breakages.

Comparative Example 3

The package, which had been obtained by the same method (the same method of Example 1 in Patent document 2) of Comparative Example 2, was loaded to a feeding roll, which is fed through motor drive at constant rotation speed, and was tried to take up without a speed-regulating roller, as performing washing, high-temperature heat treatment and adding oil by the same method of Example 1. However, when it was passed through a heater for high-temperature heat treatment, the speed of the winder fluctuated greater, and yarn breakages were caused even at 200 m/min. It can be guessed that the take-up tension transmitted to fibers in high-temperature treatment so that the heat treatment tension increased excessively to cause melt-down. Thus, even if the package after solid-phase polymerization is fed out by a feeding roller like Example 1 of Patent document 2, successive process of unrolling-washing-heat treatment cannot be achieved, and therefore fibers cannot be obtained.

Comparative Example 4

The weaving was determined without high-temperature heat treatment, by using solid-phase polymerized yarn, which had been obtained by the same method of Comparative Example 1, after unrolling and washing. Characteristics of fibers are shown in Table 4, where abrasion resistance is lowered by washing, even compared with a solid-phase polymerized yarn. During determining weaving, yarn breakages and fibril deposition became remarkable, and process passability became not good, and then, the determination was stopped. Thus, liquid crystal polyester fibers, not subjected to high-temperature heat treatment and having a peak half-width less than 15° C. at Tm1, are inferior in abrasion resistance, higher-order process passability and weavability.

Examples 2-4

Fiber diameter (fineness) and the number of filaments were determined. Melt spinning were performed by the same method of Example 1, except that the spinning condition was set as described in Table 2. Besides, all discharged filaments were taken up as a whole in Example 4. Though spinnabilities were good, because yarn breakage was caused once in Example 2, the yarn was applied again, and then, another yarn breakage was not observed. Characteristics of spun fibers obtained are shown in Table 2. The roll-back before solid-phase polymerization was performed by the same method of Example 1, except that the roll-back condition was set as described in Table 3. Next, solid-phase polymerization was performed by the same method of Example 1. Characteristics of solid-phase polymerized fibers are shown in Table 3. Processes of unrolling-washing-high-temperature heat treatment were successively performed by the method of Example 1, except that conditions of each unrolling, washing and high-temperature heat treatment were set as described in Table 4. In Example 2, the yarn became not stably taken off from the first roller and the running stability was worsened a little, without causing yarn breakage. Fiber characteristics after high-temperature heat treatment are shown in Table 4.

Also, results of determining the weaving as using obtained fibers are shown in Table 4. Passability, weavability and fabric quality were excellent in Examples 3, 4. In Example 2, a device was stopped by yarn breakage just after the determination started, and also fibril mixture was observed, however, it was good in the latter half. It can be guessed that relatively inferior abrasion resistance might have made a few fibrils deposited in processes of unrolling-washing-high-temperature heat treatment, so that the fibril deposits mixed into the outer layer portion of the package after the high-temperature heat treatment.

Examples 5-14

The resin constitutions were determined. The melt spinning was performed by the same method of Example 1, except that liquid crystal polyesters obtained in Reference Examples 2-11 were used and that spinning conditions were set as described in Table 2. Although yarn breakage was caused during spinning in each of Example 6, Example 7 and Example 10, however, another yarn breakage was not caused after the yarn was applied again. Characteristics of spun fibers are shown in Table 2. The roll-back before solid-phase polymerization was performed by the same method of Example 1, except that the roll-back conditions were set as described in Table 3. Further, the solid-phase polymerization was performed by the same method of Example 1, except that the final temperatures of the solid-phase polymerization were set as described in Table 3. Characteristics of solid-phase polymerized fibers are shown in Table 3. Processes of unrolling-washing-high-temperature heat treatment were successively performed by the method of Example 1, except that conditions of each unrolling, washing and high-temperature heat treatment were set as described in Table 4. In Examples 6, 7, the yarn became not stably taken off from the first roller, causing yarn breakage once for each. In addition, running stabilities were worsened a little, as not causing yarn breakage in Examples 13 and 14. Characteristics of high-temperature heat treated fibers are shown in Table 4.

Also, results of determining the weaving as using obtained fibers are shown in Table 4. In Example 5, passability, weavability and fabric quality were excellent. In Examples 6-14, devices were stopped by yarn breakages just after the determination started, and also fibril mixtures were observed, however, they were good in the latter halves. It can be guessed that relatively inferior abrasion resistances might have made a few fibrils deposited in processes of unrolling-washing-high-temperature heat treatment, so that the fibril deposits mixed into the outer layer portion of the package after the high-temperature heat treatment. In Examples 6 and 7, fibril deposition was observed on guides in a process after weaving. The stopping and fibril mixture, which were derived from yarn breakage, were caused relatively many times. In Examples 6 and 7, it can be guessed that inferior abrasion resistances might have generated many fibrils, and that relatively high variable waveforms and values of variable at outer diameter measurement might have made process passabilites, weavabilities and fabric qualities relatively inferior.

Examples 15, 16

Effects of surface pressure during the roll-back before solid-phase polymerization were determined. The spun fiber package obtained like Example 3 was rolled back before solid-phase polymerization by the same method of Example 3, except that the roll-back conditions were set as described in Table 5. Characteristics of solid-phase polymerized fibers are shown in Table 5. Processes of unrolling-washing-high-temperature heat treatment were performed successively under the same condition of Example 3. In Examples 15 and 16, unrolling became less stable, as causing yarn breakage once each. Characteristics of high-temperature heat treated fibers are shown in Table 6.

Results of determining weavability for the obtained fibers are shown in Table 6. In Examples 15 and 16, devices were stopped by yarn breakages just after the determination started, and also fibril mixtures were observed, however, they were good in the latter halves. It can be guessed that light fusion-bonding, caused in the solid-phase polymerized package, might have generated a few fibrils when unrolled, and that those might have deposited, so that the deposited fibrils mixed into the outer layer portion of the package after high-temperature heat treatment. In Example 15 and 16, deposited fibrils were observed on guides in a process after weaving, where the result of Example 16 was relatively inferior. In Examples 15 and 16, it can be guessed that higher surface pressure for roll-back before solid-phase polymerization might have caused light fusion-bonding so as to generate a few fibrils when unrolled, and that relatively high variable waveforms and values of variable at outer diameter measurement might have made process passabilites, weavabilities and fabric qualities relatively inferior.

Comparative Example 5

The spun fiber package obtained like Example 3 was rolled back before solid-phase polymerization by the same method of Example 15, except that the surface pressure in the roll-back before solid-phase polymerization was set to 500 gf. However, obtained package of solid-phase polymerized yarn had remarkable fusion-bonding, and yarn breakage was caused, and therefore the unrolling was not able to be performed.

Example 17

The oil adhesion amount was determined. The spun fiber package, which had been obtained like Example 3, was rolled back before solid-phase polymerization in the same method of Example 3, except that the oil to be applied when rolled back before solid-phase polymerization was water emulsion of polydimethyl siloxane (SH200 produced by Dow Corning Toray corporation) of 2.5 wt %. Characteristics of solid-phase polymerized fibers are shown in Table 5. Because the oil concentration was lowered, the oil adhesion amount was lowered. The processes of unrolling-washing-high-temperature heat treatment were successively performed under the same condition of Example 3. Unrolling became unstable so as to cause yarn breakage once in Example 17. Characteristics of high-temperature heat treated fibers are shown in table 6.

Results of determining weavability for the obtained fibers are shown in Table 6. In Example 17, a device was stopped by yarn breakages just after the determination started, and also fibril mixtures were observed, however, it was good in the latter half. It can be guessed that light fusion-bonding, caused in the solid-phase polymerized package, might have generated a few fibrils when unrolled, and that those might have deposited, so that the deposited fibrils mixed into the outer layer portion of the package after high-temperature heat treatment. In Example 17, it can be guessed that less oil adhesion might have caused light fusion-bonding so as to generate a few fibrils when unrolled, and that relatively high variable waveform and value of variable at outer diameter measurement might have made process passability, weavability and fabric quality relatively inferior.

TABLE 5

|  |  |  | Example 15 | Example 16 | Example 17 |
|---|---|---|---|---|---|
|  | Spun fiber |  | Example 3 | Example 3 | Example 3 |
| Roll-back | Winding tension | cN/dtex | 0.30 | 0.30 | 0.30 |
|  | Roll-back speed | m/min | 400 | 400 | 400 |
|  | Surface pressure | gf | 300 | 400 | 200 |
|  | Winding amount | kg | 0.19 | 0.19 | 0.19 |
|  | Winding amount | ×10,000 m | 18 | 18 | 18 |
|  | Winding density | g/cc | 0.43 | 0.50 | 0.32 |
| Final temperature of solid-phase polymerization |  | °C. | 300 | 300 | 285 |
| Treatment time at final temperature |  | hr | 20 | 20 | 20 |
| Characteristics of solid-phase polymerized fiber | Molecular weight | ×10,000 | 40.0 | 40.0 | 40.0 |
|  | Fineness | dtex | 10.4 | 10.4 | 10.2 |
|  | Fluctuation rate of fineness | % | 10 | 12 | 10 |
|  | Number of filaments | — | 1 | 1 | 1 |
|  | Fineness of single fiber | dtex | 10.4 | 10.4 | 10.4 |
|  | Strength | cN/dtex | 20.2 | 18.8 | 20.1 |
|  | Fluctuation rate of tenacity | % | 8 | 8 | 9 |
|  | Elongation | % | 2.8 | 2.6 | 2.8 |
|  | Elastic modulus | cN/dtex | 953 | 922 | 948 |
|  | Compression elastic modulus | GPa | 0.27 | 0.26 | 0.27 |
|  | Δ2θ | ° | 1.3 | 1.3 | 1.3 |
|  | Tm1 | °C. | 334 | 333 | 334 |
|  | ΔHm1 | J/g | 8.7 | 8.7 | 8.7 |
|  | Peak half width at Tm1 | °C. | 11 | 11 | 11 |
|  | Tc | °C. | 274 | 274 | 274 |
|  | ΔHc | J/g | 3.4 | 3.4 | 3.4 |
|  | Tm2 | °C. | 329 | 329 | 329 |
|  | ΔHm2 | J/g | 1.2 | 1.2 | 1.2 |
|  | Oil adhesion amount | wt % | 1.0 | 4.0 | 2.4 |
|  | Polysiloxane adhesion |  | present | present | present |
|  | Abrasion resistance C | second | 12 | 11 | 11 |

TABLE 6

|  |  |  | Example 15 | Example 16 | Example 17 |
|---|---|---|---|---|---|
| Fiber subjected to heat treatment (Solid-phase polymerization system) |  |  | Example 15 | Example 16 | Example 14 |
| Unrolling | Unrolling speed | m/min | 400 | 400 | 400 |
| Washing | Bath length | mm | 1500 | 1500 | 1500 |
|  | Unrolling - Heat treatment Successive/Not successive |  | Successive | Successive | Successive |
| High-temperature heat treatment | Treatment temperature | °C. | 490 | 490 | 490 |
|  | Treatment length | mm | 1000 | 1000 | 1000 |
|  | Treatment speed | m/min | 400 | 400 | 400 |
|  | Treatment time | sec | 0.15 | 0.15 | 0.15 |
|  | Running tension | gf | 1.5 | 1.5 | 1.5 |
|  | Running stress | cN/dtex | 0.15 | 0.15 | 0,15 |
|  | Running stability | — | Δ | Δ | Δ |
| Characteristics of high-temp. heat treated fiber (Characteristics of fiber served to test weaving) | Fiber length | ×10,000 m | 18 | 18 | 18 |
|  | Molecular weight | ×10,000 | 40.1 | 40.1 | 40.1 |
|  | Fineness | dtex | 10.1 | 10.1 | 10.1 |
|  | Fluctuation rate of fineness | % | 11 | 13 | 11 |
|  | Variable waveform of U % H | % | 6 | 9 | 7 |
|  | Value of variable at outer diameter measurement | % | 18 | 23 | 17 |
|  | Number of filaments | — | 1 | 1 | 1 |

TABLE 6-continued

|  |  |  | Example 15 | Example 16 | Example 17 |
|---|---|---|---|---|---|
|  | Fineness of single fiber | dtex | 10.1 | 10.1 | 10.1 |
|  | Strength | cN/dtex | 14.7 | 14.3 | 14.6 |
|  | Fluctuation rate of tenacity | % | 10 | 17 | 11 |
|  | Elongation | % | 2.7 | 2.5 | 2.6 |
|  | Elastic modulus | cN/dtex | 673 | 641 | 664 |
|  | Compression elastic modulus | GPa | 0.20 | 0.20 | 0.20 |
|  | Δ2θ | ° | 2.9 | 2.9 | 2.9 |
|  | Tm1 | °C. | 320 | 320 | 320 |
|  | Exothermic peak | J/g | none | none | none |
|  | ΔHm1 | J/g | 1.0 | 1.0 | 1.0 |
|  | Peak half width at Tm1 | °C. | 25 | 25 | 25 |
|  | Tc | °C. | 275 | 275 | 275 |
|  | ΔHc | J/g | 3.5 | 3.5 | 3.5 |
|  | Tm2 | °C. | 329 | 329 | 329 |
|  | ΔHm2 | J/g | 1.3 | 1.3 | 1.3 |
|  | Oil adhesion amount | wt % | 0.5 | 0.5 | 0.2 |
|  | Polysiloxane adhesion | — | present | present | present |
|  | Abrasion resistance C | sec | 73 | 52 | 68 |
| Weaving | Process passability | — | ○ | ○ | ○ |
|  | Weavability | — | ○ | ○ | ○ |
|  | (Number of stops) |  | (8 times) | (8 times) | (8 times) |
|  | Fabric quality | — | ○ | ○ | ○ |
|  | (Number of fibrils, scums) |  | (8 pieces) | (9 pieces) | (8 pieces) |

Hereinafter, desirable embodiments of a producing method of liquid crystal polyester fibers according to the present invention will be explained by Examples 18-21 and Comparative Examples 6-9.

Example 18

Using the liquid crystal polyester of Reference Example 2, after a vacuum drying was carried out at 160° C. for 12 hours, it was melt extruded by a single-screw extruder (heater temperature of 290-340° C.) of φ15 mm produced by Osaka Seiki Kosaku Corporation, and the polymer was supplied to a spinning pack while metered by a gear pump. The spinning temperature from outlet of the extruder to the pack for spun fibers was set to 345° C. In the spinning pack, the polymer was filtered using a metal nonwoven fabric filter (LFW-10 produced by Watanabe Giichi Seisakusho Corporation), and the polymer was discharged from a die at discharge flow of 3.0 g/min from a die having 5 holes of hole diameter of 0.13 mm and land length of 0.26 mm The discharged polymer was cooled and solidified from the outer side of the yarn by an annular cooling air wind after passing through a heat retaining region of 40 mm, and thereafter, polyether spinning oil was given, and 5 filaments as a whole were wound to the first godet roll. The spinning draft was 32. After this was passed through the second godet roll having the same speed, 4 of 5 filaments were sucked by a suction gun, and the remaining one filament was taken up into a pirn form via a dancer arm using a pirn winder (no contact roller contacting with a take-up package). During the take-up time of about 100 minutes, yarn breakage did not occur and the spinnability was good. Characteristics of obtained fibers were, fineness of 5.0 dtex, strength of 5.9 cN/dtex, elongation of 1.2%, and elastic modulus of 514 cN/dtex.

The fibers were unrolled in a vertical direction (in a direction perpendicular to the fiber rounding direction), and without through a speed-regulating roller, it was rolled back, at 100 m/min and surface pressure of 50 gf, from this spun fiber package by a winder (SSP-MV8P type precision winder (contact length of 200 mm, the number of winding of 8.7) produced by Kamitsu Seisakusho Corporation). Here, water emulsion as a fusion inhibitor including polydimethyl siloxane (SH200 produced by Dow Corning Toray Corporation) of 5 wt % was given to the fibers supplied using a stainless-steel roll with pearskin-finished surface in front of the winder. The adhesion amount of the fusion inhibitor was 3.0 wt %. A stainless-steel bobbin with holes and wound thereon with a Kevlar felt (weight: 280 g/m2, thickness: 1.5 mm) was used as a core member for roll-back, where the tension was set to 0.05 cn/dtex when rolled back, and the winding amount was set to 20,000 m. The package was formed into a taper-end winding with taper angle of 45°. The winding density of the package, which had been taken up, was 0.08 g/cm³.

The solid-phase polymerization was performed under a condition where the temperature was elevated from a room temperature to 240° C. for about 30 minutes using a closed type oven, after it was kept at 240° C. for 3 hours, it was elevated to 295° C. a temperature elevation speed of 4° C./hour, and further kept at 295° C. for 15 hours. As to the atmosphere, dehumidified nitrogen was supplied at a flow rate of 25 NL/min, and it was discharged from an exhaust port so as not to pressurize the inside. Melting point Tm1 of the fibers obtained was 335° C.

After the solid-phase polymerized package was loaded on a device which freely rotated, fibers were unrolled in a weft direction (in a fiber rounding direction), and the unrolled fibers were passed through a water tank filled with wash water of 40° C., at a bath length of 100 cm (contact length was 100 cm) in order to remove the fusion inhibitor. After dripping water by pressure air, the fibers were rolled at 200 m/min on the Nelson-type first roller by 6 rounds, and successively, heat treated at 480° C. (Tm1+145° C.) by a slit heater having a slit width of 5.6 mm and a length of 1,000 mm, during running without contacting to the heater. After that, they were supplied with water emulsion containing oil, whose main constituent was fatty acid ester, by 1 wt %, in a position at 10 mm from the heater outlet through an oiling guide made by ceramic with a nozzle diameter of 1 mmφ, at flow rate of 0.1 cc/min from the fiber bottom, and the forced cooling was performed by contacting them. The wash water was prepared as containing nonionic-anionic surfactant (Gran Up US-30 produced by Sanyo Chemical Industries Corporation) by 1.0 wt %. After that, the yarn was taken up at 201 m/min on the Nelson-type second roller by 6 rounds, it was taken up by a winder (ET-type speed-regulating winder produced by Kamitsu Seisakusho Corporation). Oil adhesion was 1.1 wt %, removal rate of fusion inhibitor was 61%, fineness was 5.0 dtex, strength was 15.8 cN/dtex, elongation was 2.7%, and elastic modulus was 876 cN/dtex.

Producing conditions and results of determination for obtained fibers are shown in Table 7. The obtained fibers showed excellent characteristics as results of determining flexion abrasion resistances.

Comparative Example 7

Without using the first roller in Example 18, after the yarn was passed through the water tank of 40° C., the heater for heat treatment and the forced cooling device, rolled at 201 m/min on the Nelson-type second roller by 6 rounds, it was taken up by a winder (ET-type speed-regulating winder produced by Kamitsu Seisakusho Corporation). However, yarn breakage was caused in a few minutes.

TABLE 7

| | Example 18 | Comparative Example 6 | Example 19 | Comparative Example 7 | Comparative Example 8 | Comparative Example 9 | Example 20 | Example 21 |
|---|---|---|---|---|---|---|---|---|
| Take-up after solid-phase polymerization | No | Yes | No | No | No | No | No | No |
| Fusion inhibitor addition | Yes | Yes | Yes | Yes | Yes | Yes | Yes | No |
| Fusion inhibitor removal | Yes | Yes | No | Yes | Yes | Yes | Yes | Yes |
| First roller | Yes | Yes | Yes | No | Yes | Yes | Yes | Yes |
| Second roller | Yes | Yes | Yes | Yes | No | Yes | Yes | Yes |
| First/Second roller speed (m/min) | 200/201 | 200/201 | 200/201 | —/201 | 200/— | 200/201 | 200/201 | 50/50 |
| Heal treatment temperature (° C.) | 480 | 480 | 480 | 480 | 480 | 385 | 415 | 460 |
| Difference between heat treatment temp. and Tm1 (° C.) | Tm1 + 145 | Tm1 + 145 | Tm1 + 145 | Tm1 + 145 | Tm1 + 145 | Tm1 + 50 | Tm1 + 80 | Tm1 + 125 |
| Number of fibrils (1/m$^2$) | 0 | 8.9 | 0 | 0 | 0 | 0 | 0 | 0 |
| Scum generation | ◯ | Δ | Δ | — | — | ◯ | ◯ | ◯ |
| Flexion abrasion resistance (times) | 52 | 45 | 58 | — | — | 5 | 24 | 44 |

Comparative Example 6

After the solid-phase polymerization was performed like Example 18, obtained solid-phase polymerized package was loaded to a freely-rotatable device. After the yarn was rolled at 200 m/min on the Nelson-type roll by 6 rounds as unrolled in a weft direction (in a fiber rounding direction), it was taken up by a winder (ET-type speed-regulating winder produced by Kamitsu Seisakusho Corporation). The taken-up fibers were unrolled in a weft direction and passed through a water tank at 40° C. like Example 18, and then were rolled at 200 m/min on the Nelson-type first roller by 6 rounds. Successively, they were heat treated at 480° C. and then forced cooling was performed. After that, the yarn was rolled at 201 m/min on the Nelson-type second roller by 6 rounds, it was taken up by a winder (ET-type speed-regulating winder produced by Kamitsu Seisakusho Corporation). Obtained fiber characteristics are shown in Table 7. Because the take-up was performed after solid-phase polymerization in Comparative Example 6, there were many fibrils and the result was inferior in scum generation.

Example 19

After the solid-phase polymerization was performed like Example 18, obtained solid-phase polymerized package was loaded to a freely-rotatable device. After the fibers were rolled at 200 m/min on the Nelson-type first roller by 6 rounds as unrolled in a weft direction (in a fiber rounding direction), without washing process in Example 18. Successively, the heat treatment and forced cooling were performed like Example 18. After that, the yarn was rolled at 201 m/min on the Nelson-type second roller by 6 rounds, it was taken up by a winder (ET-type speed-regulating winder produced by Kamitsu Seisakusho Corporation). Obtained fiber characteristics are shown in Table 7. Because the washing was not performed in Example 19, the result was relatively inferior in scum generation.

Comparative Example 8

After the liquid crystal polyester fibers were heat treated and passed through the forced cooling device like Example 18, they were taken up by a winder (ET-type speed-regulating winder produced by Kamitsu Seisakusho Corporation) without using the second roller. However, yarn breakage was caused in a few minutes.

Comparative Example 9

Liquid crystal polyester fibers were obtained like Example 18, except that the heat treatment temperature was set to 385° C. (Tm1+50° C.). Obtained fiber characteristics are shown in Table 7. Because the heat treatment temperature was low in Comparative Example 9, the results for obtained fibers were inferior in flexion abrasion resistance.

Example 20

Liquid crystal polyester fibers were obtained like Example 18, except that the heat treatment temperature was set to 415° C. (Tm1+80° C.). Obtained fiber characteristics are shown in Table 7. Because the heat treatment temperature was low in Example 20, the results for obtained fibers were superior in flexion abrasion resistance.

Example 21

Solid-phase polymerization was performed like Example 18, except that the fusion inhibitor was not given after taking spun fibers up. Hereafter, processes of unrolling, fusion inhibitor removal and heat treatment were performed like Example 18, and then yarn breakage was caused by fusion-bonding of the package at the first roller speed of 200 m/min. When the first roller speed was lowered to 50 m/min, yarn breakage was not caused when unrolled. Further, heat treatment was performed at heat treatment temperature lowered to 460° C., and it was taken up by a winder after it was rolled at 50 m/min on the second roller. Obtained fiber characteristics are shown in Table 7. Because the fusion inhibitor was not given before solid-phase polymerization in Example 21, oil was less adhered to, yarn breakage was caused when unrolled and the unrolling speed was low as 50 m/min.

The result was relatively inferior in productivity.

INDUSTRIAL APPLICATIONS OF THE INVENTION

The liquid crystal polyester and the liquid crystal polyester monofilament according to the present invention are suitable particularly for uses of filters and screen gauzes required with high-mesh woven fabrics.

The invention claimed is:

1. A method for producing liquid crystal polyester fibers which comprises:
    forming liquid crystal polyester fibers into a package,
    subjecting said fibers to solid-phase polymerization,
    unrolling from said package solid-phase polymerized liquid crystal polyester fibers, and
    without further taking up into a package, successively heat treating said solid-phase polymerized liquid crystal polyester fibers,
    wherein the temperature of said heat treatment is controlled at a temperature of an endothermic peak temperature (Tm1) of said solid-phase polymerized liquid crystal polyester fibers+60° C. or higher, and a speed of said fibers before and after heat treatment is regulated, respectively, by a first roller and a second roller.

2. The method for producing liquid crystal polyester fibers according to claim 1, wherein a fusion inhibitor is applied to said liquid crystal polyester fibers before solid-phase polymerization, and while solid-phase polymerized liquid crystal polyester fibers are unrolled from said package, said fusion inhibitor is removed at a position before said first roller.

3. The method for producing liquid crystal polyester fibers according to claim 1, wherein said liquid crystal polyester fibers to be subjected to solid-phase polymerization are taken up at a contact pressure of 50 gf or more and 400 gf or less when said fibers are formed into said package.

* * * * *